(12) United States Patent
Fujioka

(10) Patent No.: US 6,907,227 B2
(45) Date of Patent: Jun. 14, 2005

(54) METHOD AND SYSTEM FOR MANAGING WIRELESS CONNECTION BETWEEN SLAVE TERMINALS AND MASTER TERMINAL

(75) Inventor: Susumu Fujioka, Zama (JP)

(73) Assignee: Ricoh Co., Ltd., Tokyo (JP)

( * ) Notice: Subject to any disclaimer, the term of this patent is extended or adjusted under 35 U.S.C. 154(b) by 454 days.

(21) Appl. No.: 10/141,749

(22) Filed: May 9, 2002

(65) Prior Publication Data

US 2002/0193073 A1 Dec. 19, 2002

(30) Foreign Application Priority Data

May 10, 2001 (JP) .................................. 2001-140568

(51) Int. Cl.[7] .......................... H04B 5/00; H04L 12/403
(52) U.S. Cl. ...................... 455/41.3; 455/512; 370/449
(58) Field of Search ........................... 455/422.1, 41.1, 455/41.2, 41.3, 507, 509, 512; 370/449, 455

(56) References Cited

U.S. PATENT DOCUMENTS 6,640,268 B1 * 10/2003 Kumar ....................... 710/46
6,829,487 B2 * 12/2004 Eiden et al. ................ 455/519
2003/0076842 A1 * 4/2003 Johansson et al. .......... 370/401

FOREIGN PATENT DOCUMENTS

JP        2000-276269        10/2000

* cited by examiner

*Primary Examiner*—Nguyen T. Vo
(74) *Attorney, Agent, or Firm*—Knoble Yoshida & Dunleavy LLC

(57) ABSTRACT

Slave terminals and a master terminal are wirelessly connected according to the Bluetooth protocol. When a number of the slave terminals exceeds a predetermined number of the slave terminals for the wireless connection, the wireless connections are controlled by a predetermined set of rules. Active slave terminals are switched into inactive slave terminals according to the predetermined rules so as to efficiently use the resources in the system. The system is used for a data conferencing or class room instructions.

41 Claims, 17 Drawing Sheets

1

METHOD AND SYSTEM FOR MANAGING WIRELESS CONNECTION BETWEEN SLAVE TERMINALS AND MASTER TERMINAL

FIELD OF THE INVENTION

The current invention is generally related to a method of and a system for wireless communication, and more particularly related to a wireless communication method and system that involve a master terminal and its corresponding slave terminals.

BACKGROUND OF THE INVENTION

Prior art technologies involve infrared light which has high directionality and is not usable with any interfering object. Because of the above characteristics, the prior art technologies suffer from flexibility in connection and ease of use.

In the recent years, the Bluetooth protocol has been developed to wirelessly connect peripherals or terminals. The Bluetooth protocol involves a radio wave technology to connect the peripherals and terminals without any cables. Bluetooth involves a short-distance radio wave technology that lacks strong directionality and is resilient with interfering objects. Because of the above characteristics, the Bluetooth technology is more desirable than the above described prior art infrared technology.

Furthermore, according to the Bluetooth protocol, peripheral devices and terminals are easily connected with each other any time and any where without user intervention. The Bluetooth protocol specifies 2.4 GHz for communicating at a maximal rate of 1 mega bits per second (Mbps) over up to approximately 100 meters. The following prior art includes the above described Bluetooth technology.

Japanese Patent Publication Hei 2000-276269 discloses a wireless data input device for transmitting data from a keyboard or a mouse to a plurality of computers based upon the Bluetooth protocol. A user selects a predetermined computer by a switch so that a single data input device services a plurality of the computers without cable connections and limitation to the location. No disclosure is provided with respect to the Bluetooth protocol.

Toshiba recently introduced a video conferencing system called "SPANworks 2000" based upon the Bluetooth protocol. The system includes personal computers that are each equipped with a PCMCIA card for communicating according to the Bluetooth protocol. In the Bluetooth network or piconet, a master terminal simultaneously transmits presentation image data to a plurality of slave terminals. Since the slave terminals are always active in the network and cannot be placed in a sleep mode or a low power consumption mode, a maximal number of the slave drives is limited to seven. The version 1.0B of the Bluetooth protocol limits the above maximal number of seven active slave terminals for each master terminal. Although the save Bluetooth protocol provides that the active slave terminals can be put into a park mode, an inactive state or a sleep mode in order to have more than seven slave terminals, no enabling disclosure has been provided for implementation. The park mode, the inactive state or the sleep mode are used synonymously used throughout in the current application.

For example, one implementation is for a master terminal to switch the mode of a slave terminal based upon a request from the slave terminal. Upon receiving a request from one of more than seven slave terminals that are connected to a master terminal via the piconet, the master terminal unconditionally switches a park or inactive slave mode into an active mode in the corresponding slave terminal. During a video conference, the above scheme causes the slave terminals to have significantly uneven time for data transmission. Consequently, the video conference is disturbed.

For the above described reasons, it is desired that a plurality of the slave terminals should have an efficient connection scheme in the piconet.

SUMMARY OF THE INVENTION

In order to solve the above and other problems, according to a first aspect of the current invention, A method of controlling wireless communication between a master terminal and slave terminals, including; a) establishing a connection between the master terminal and a predetermined maximal number of the slave terminals to have active slave terminals; b) identifying remaining unconnected slave terminals as inactive slave terminals in case a number of the slave terminals exceeds the predetermined maximal number; c) removing one of the active slave terminals from the connection to turn into an inactive slave terminal while establishing one of the inactive terminals for the connection with the master terminals in case the number of the slave terminals exceeds the predetermined maximal number; d) repeating the step c) until every one of the slave terminals is at least once connected with the master terminal; and e) communicating among the master terminal and the active slave terminals until a predetermined condition is met.

According to a second aspect of the current invention, a system for controlling wireless communication, including; a number of slave terminals; and a master terminal for establishing a wireless connection between the master terminal and a predetermined maximal number of the slave terminals to have active slave terminals in accordance with the Bluetooth protocol, the master terminal identifying remaining unconnected slave terminals as inactive slave terminals in case the number of the slave terminals exceeds the predetermined maximal number, the master terminal removing one of the active slave terminals from the wireless connection to turn into an inactive slave terminal while establishing one of the inactive terminals for the wireless connection with the master terminals until every one of the slave terminals is at least once wirelessly connected with the master terminal, the master terminal communicating among the master terminal and the active slave terminals until a predetermined condition is met.

According to a third aspect of the current invention, a master terminal for controlling wireless communication among a number of slave terminals, including: a Bluetooth module for establishing a wireless connection between the master terminal and a predetermined maximal number of the slave terminals to have active slave terminals in accordance with the Bluetooth protocol; and a CPU operationally connected to the Bluetooth module for identifying remaining unconnected ones of the slave terminals as inactive slave terminals in case the number of the slave terminals exceeds the predetermined maximal number, the CPU instructing the Bluetooth module to remove one of the active slave terminals from the wireless connection to turn into one of the inactive slave terminals while establishing one of the inactive terminals for the wireless connection with the master terminal until every one of the slave terminals is at least once wirelessly connected with the master terminal, the master terminal communicating with the active slave terminals until a predetermined condition is met.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Based upon incorporation by external reference, the current disclosure incorporates every disclosure in the corresponding foreign priority document (JP 2001-140568) from which the current application claims priority.

In general, the current invention involves a method of and a system for a master terminal to communicate with more than seven slave terminals according to the Bluetooth protocol. A preferred embodiment of the data conferencing system according to the current invention is implemented by connecting a set of conference devices that are equipped with the Bluetooth protocol on a Bluetooth network. Furthermore, the data conferencing system is utilized as an educational system that connects a teacher terminal or an electronic blackboard with individual student terminals on the Bluetooth network. In the current patent disclosures, data conferencing and a data conference respectively include video conferencing and a video conference. In the preferred embodiment, the master terminal that is connected to the Bluetooth network controls the status of a slave terminal that is also connected to the Bluetooth network. The status of the slave terminal is either an active state or an inactive/park state. In the active state, the slave terminal is able to communicate with the Bluetooth network. In contrast, in the park state, the slave terminal is not able to communicate with the slave terminal in a direct manner except for a predetermined periodic communication for maintenance. Due to the above control, more than seven slave terminals are virtually connected to the Bluetooth network at the same time.

According to the Bluetooth protocol, the radio signal strength deteriorates over distance in an inversely squared manner. Because of the deterioration, the actual data transmission speed varies depending upon the distance between the terminals. In transmitting the same data to a large number of terminals in data conferencing at a varying data transmission speed, the transmission time increases as the terminal is located further away from the transmission source. When the data is simultaneously transmitted to more than seven slave terminals by switching between the active and park state, the communication control method according to the current invention takes the above described varying transmission speed into account.

Figure 1:
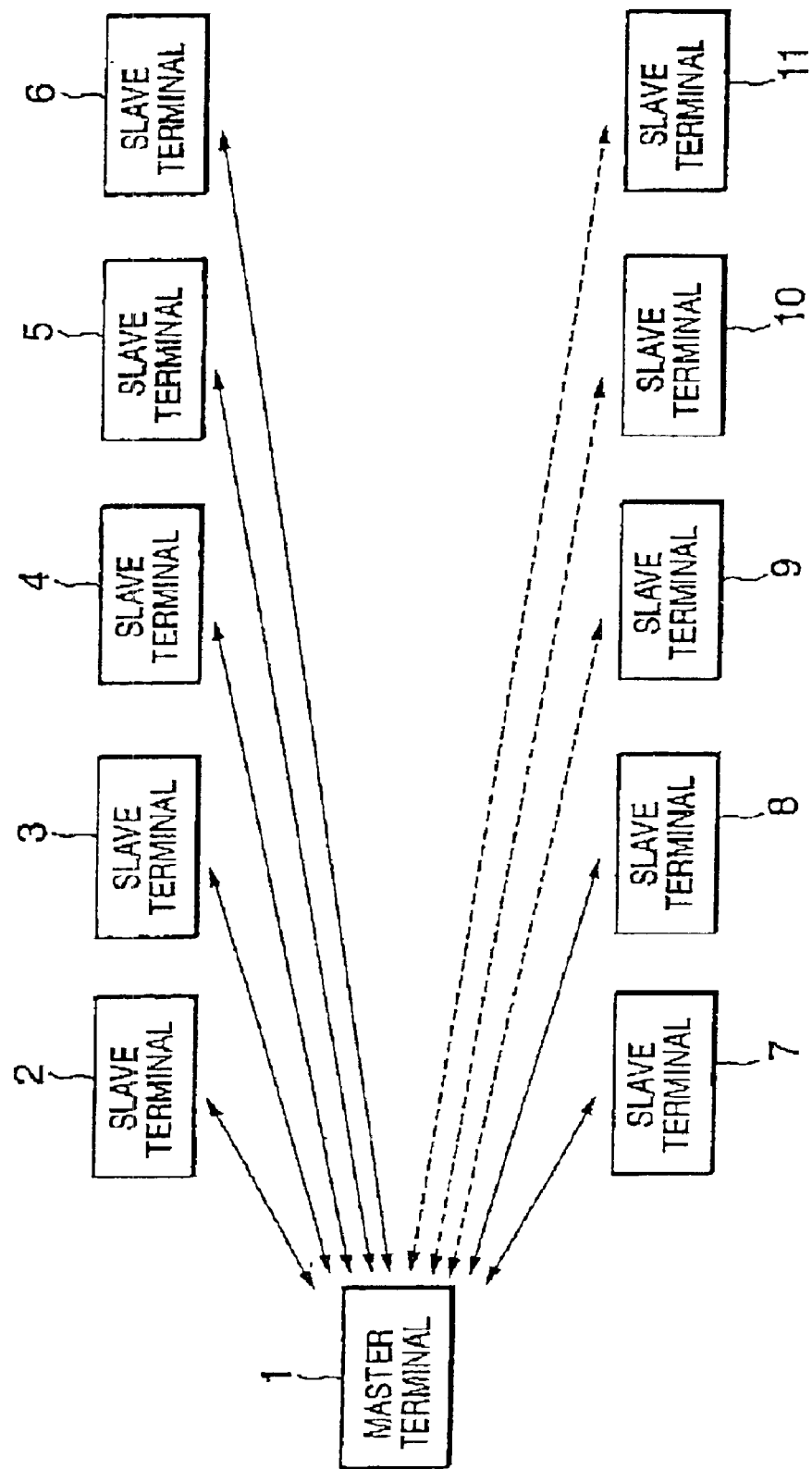
FIG. 1 is a diagram illustrating one preferred embodiment of the Bluetooth network system according to the current invention.

Referring now to the drawings, wherein like reference numerals designate corresponding structures throughout the views, and referring in particular to FIG. 1, a diagram illustrates one preferred embodiment of the Bluetooth network system according to the current invention. The preferred embodiment includes a single master terminal 1 and ten portable display pads or slave terminals 2 through 11 that are wirelessly connected to the master terminal 1 in the piconet. At an initial stage, it is assumed that the slave terminal 2 through 8 are in a predetermined active state with respect to the piconet as indicated by solid lines while the slave terminals 9 through 11 are in a predetermined inactive or park mode state with respect to the piconet as indicated by dotted lines. The above described virtual wireless connections change based upon the data transfer needs of the salve terminals 2 through 11. As any one of the inactive slave terminals 9 through 11 needs the data transmission, the master terminal 1 releases one of the active slave terminals 2 through 8 and places it in the inactive state. Consequently, the master terminal 1 places the requesting inactive slave terminal in the active state. The master terminal 1 initiates the above described state switch based upon the detection of the state change request from the slave terminal during a predetermined periodic signal polling operation.

Figure 2:
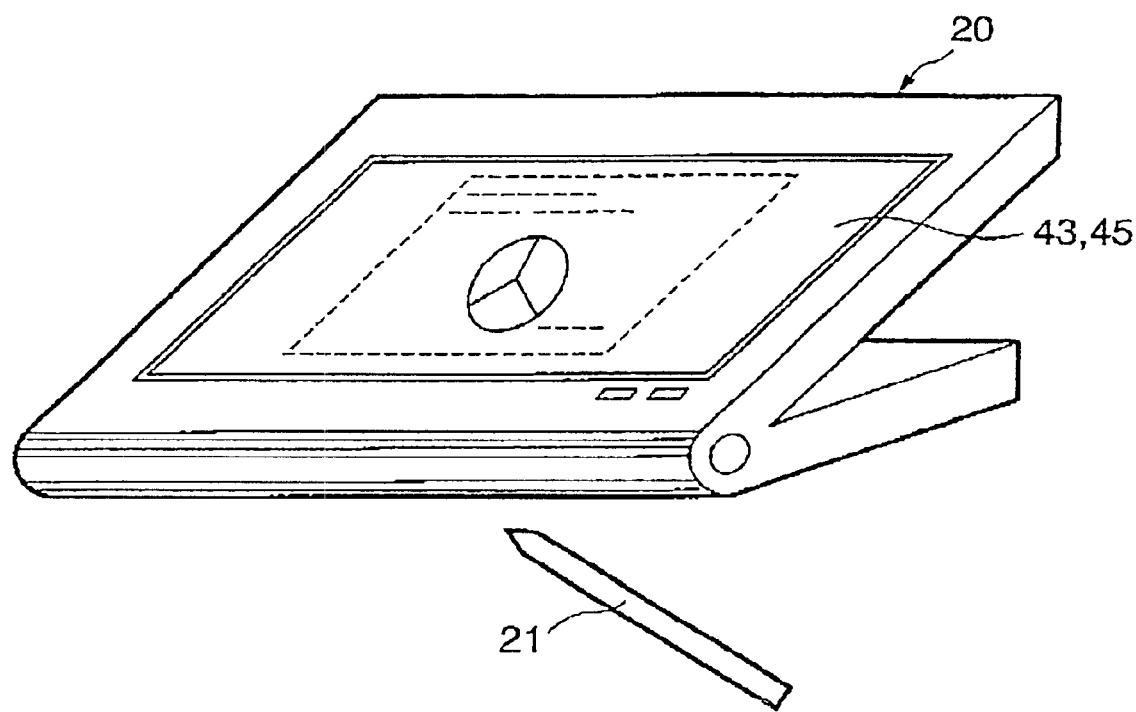
FIG. 2 is a diagram illustrating a prospective view of one preferred embodiment of the portable display terminal according to the current invention.

Now referring to FIG. 2, a diagram illustrates a prospective view of one preferred embodiment of the portable display terminal according to the current invention. The portable display terminals 20 is used as the master terminal 1 or any one of the slave terminals 2 through 11 as shown in FIG. 1. The portable display terminals 20 includes a liquid crystal display (LCD) panel 43, a touch panel input device 43 that is placed over the LCD panel and a stylus 21 for inputting data on the touch panel 43.

Figure 3:
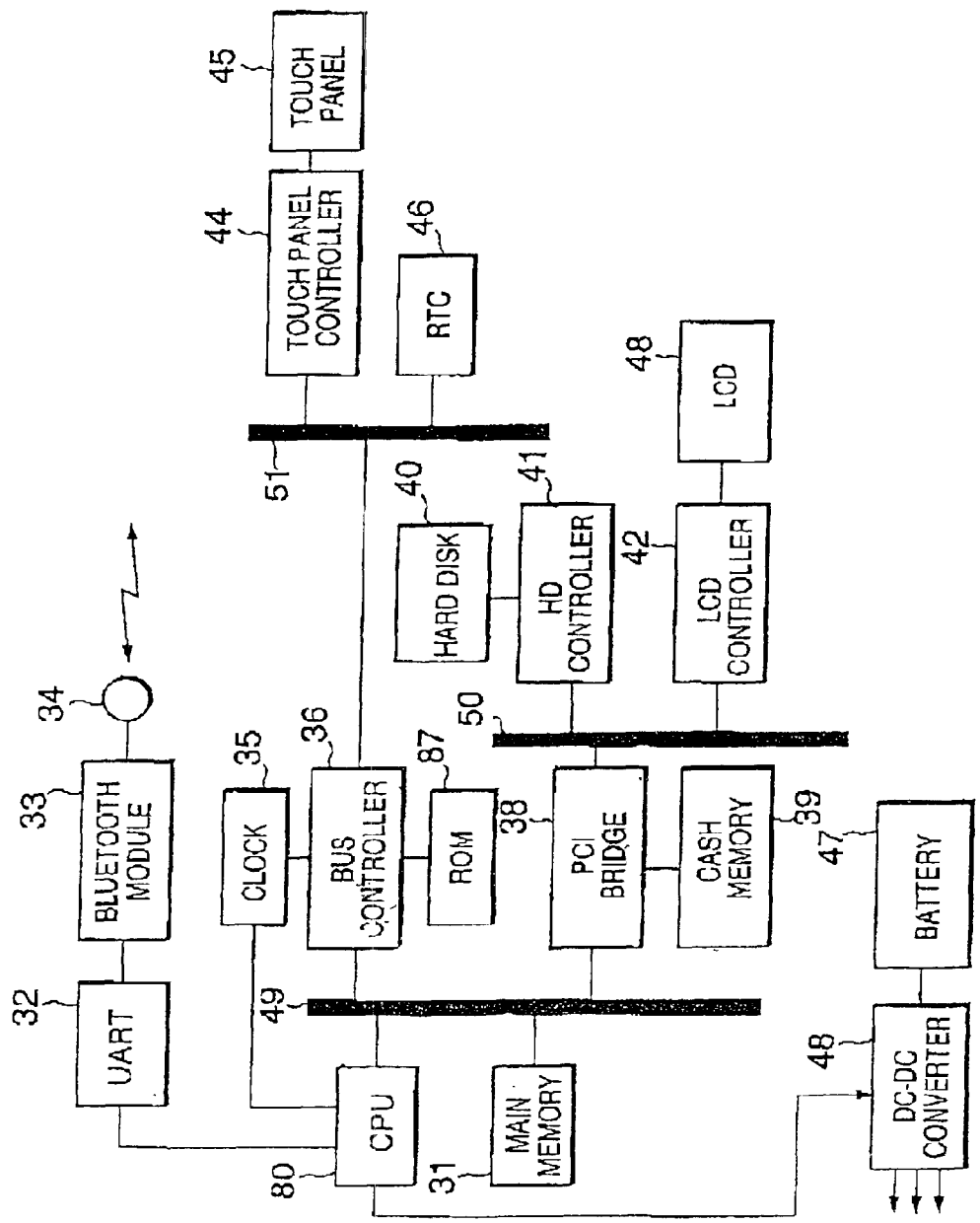
FIG. 3 is a block diagram illustrating components of the preferred embodiment of the portable display terminal according to the current invention.

Now referring to FIG. 3, a block diagram illustrates components of the preferred embodiment of the portable display terminal 20 according to the current invention. The portable display terminal 20 is used as the master terminal 1 or one of the slave terminals 2 through 11. The portable display terminal 20 further includes a central processing unit (CPU) 30, a main memory unit 31, a universal asynchronous receiver transmitter (UART) 32, a Bluetooth module 33, an antenna 34, a clock 35, a bus controller 36, a read-only memory (ROM) 37, a peripheral component interconnect (PCI) bridge 38, a cache memory unit 39, a hard disk 40, a HD controller 41, a LCD controller 42, a LCD 43, a touch panel controller 44, a touch panel 45, a real time clock (RTC) 46, a battery 47, a DC—DC converter 48, a CPU bus 49, a PCI bus 50 and a X bus 51. The CPU 30 executes various application programs, operating system (OS) processes as well as control processes that are stored in the ROM 37. The main memory unit 31 includes a dynamic random access memory (DRAM) and is used as a work area for the CPU 30. The UART 32 is an interface for serial data transfer between the CPU 30 and the Bluetooth module 33. The UART 32 further includes shift registers such as first in, first out (FIFO). The Bluetooth module 33 further includes a RF portion and a base band portion and performs wireless communication according to the Bluetooth protocol. The Bluetooth communication will be further described later.

Still referring to FIG. 3, other components of the preferred embodiment are described herein after. The clock 35 further includes a crystal oscillator element and a frequency demultiplier circuit and generates clock signals for controlling timing of the CPU 30 and the bus controller 36. The bus controller 36 controls the data transfer of the CPU bus 49 and the X bus 51. The ROM 37 has been written with control programs for controlling various devices and for initiating the system at the power-on. The PCI bridge 38 transfers data between the CPU 30 and the PCI bus 50 based upon the cash memory unit 39. The cash memory unit 39 further includes the DRAM and is used by the PCI bridge 38. The hard disk unit 40 stores system software, various application programs and a plurality of user data. The hard disk controller 41 is an interface to the hard disk unit 40 and performs high-speed data transmission. The hard disk interface is integrated device electronics (IDE). The LCD display controller 42 converts characters and graphics data from a digital form to an analog form and controls the data for displaying on the LCD 43. The touch panel controller 44 detects a contact portion where the tip of the stylus 21 touches over the touch panel surface 45 and reads the position of the contact portion. The touch panel 45 is overlapped over the LCD 43 and contacts the LCD 43. The RTC 46 is a time and date clock and further equipped with a back-up battery that is not shown in the drawing. Examples of the battery 47 include a nickel hydrogen battery and a lithium battery. The DC—DC converter 48 provides current to the portable display terminal 20.

Figure 4:
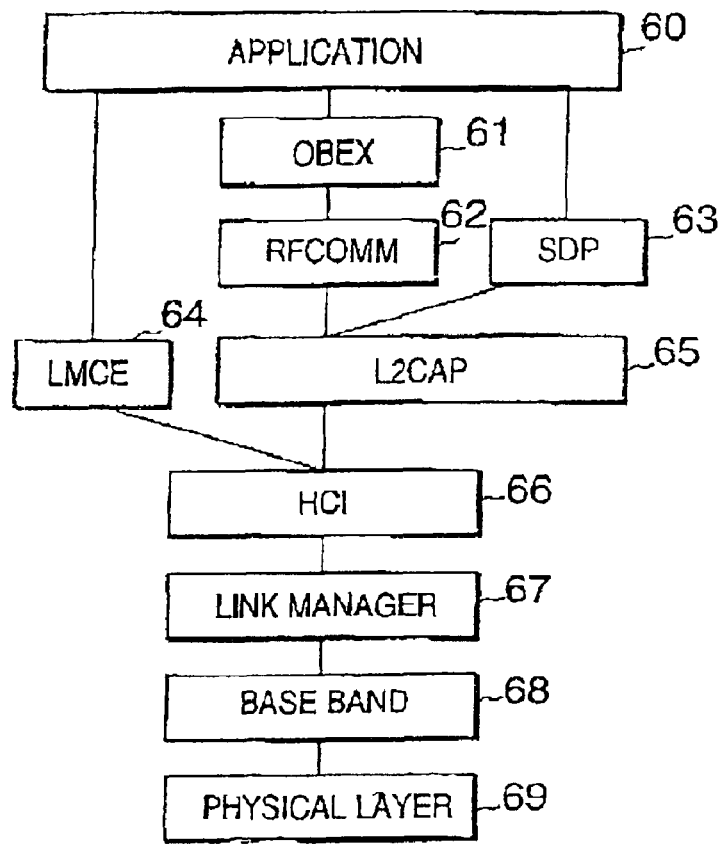
FIG. 4 is a block diagram illustrating layer components according to the Bluetooth communication protocol.

Now referring to FIG. 4, a block diagram illustrates layer components according to the Bluetooth communication protocol. Application 60 includes application programs for conducting a data conferencing. The application programs handle a connection or disconnection request for the Bluetooth network as well as a transmission request of image data and conference-related files. The object exchange (OBEX) 61 establishes an OBEX session with a terminal and controls the communication protocol such as object push in transmitting graphic data and file data transfer. The RF communication (RFCOMM) 62 is a transfer protocol for emulating a serial port on the logical link control and adaptation protocol (L2CAP). The service discovery protocol (SDP) 63 confirms a service that is to be used with the communicating terminal and provides the application 60 with a means to extract the characteristics of the service. Link manager control entity (LMCE) 64 is a communication module that is not included in Blue tooth version 1.1. LMCE 64 is used to send commands from the applications 60 to a link manager 67 when the OBEX 61 or a SDP 63 is not used for the same purpose. The L2CAP 65 multiplexes the upper layers protocol and performs the segmentation and reassembly of L2CAP data packets. A host controller interface (HCI) 66 is an interface between the host CPU 30 and the Bluetooth module 33. The HCI 66 includes a HCI application program interface (API), the UART 32 functioning as a transport layer between the host CPU 30 and the Bluetooth module 33 and a hardware driver for the Bluetooth module 33. The link manager 67 executes link manager protocol (LMP) for controlling links such as establishing and disconnecting the links and placing the link into an inactive or park mode. A base band 68 transmits and receives various packets as well as establishes a physical link. A physical layer 69 modulates signals by Gaussian frequency shift keying (GFSK) and communicates via spread spectrum using.

Still referring to FIG. 4, other characteristics for the Bluetooth protocol includes the following. The frequency for the Bluetooth protocol ranges from 2471 to 1497 MHz in Japan while the number of hopping channels is twenty-three per 1 MHz. The hopping speed is 1600 hop per second. Furthermore, the channel is divided into 25 $\mu$sec time slots. The master terminal initiates its packet transmission on even-numbered time slots while the slave terminal initiates its packet transmission on odd-numbered time slots. In the above described protocol, an UART driver and the hardware driver for the Bluetooth module 33 in the HCI 66, the link manager 67, the base band 68 and the physical layer 69 are equipped in the Bluetooth module 33. Other components of the Bluetooth protocol are tasks or software modules that are executed by the CPU 30, and these software programs are stored in the hard disk unit 40. Furthermore, the image data is transmitted via serial transmission through a serial transmission entity in stead of the OBEX 61. The serial transmission entity has not been shown in the diagram.

With respect to FIGS. 3 and 4, the following descriptions are provided for the related sub-protocols and operations for the Bluetooth protocol. The following communication sequence is executed to establish the Bluetooth network or picket.

Base Band Protocol

Initially, the master terminal 1 identifies slave terminals that are capable of communicating with the master terminal 1 via an inquiry sequence. That is, the master terminal 1 repeatedly transmits an ID packet, and the receiving slave terminals 2 through 11 transmits to the master terminal 1 a FHS packet that includes a Bluetooth device address (BD_ADDR) and system clock information of the corresponding slave terminal. In response, the master terminal 1 confirms the number of the slave terminals based upon the number of the BD_ADDR's in the received FHS packets. For example, as shown in FIG. 1, the master terminal 1 confirms ten slave terminals 2 through 11 and stores the identified number in the main memory unit 31. Subsequently, the master terminal 1 consecutively establishes connection for communication with the seven slave terminals. Assuming that the slave terminal 2 is to be connected, the communication is established by the master terminal 1 by transmitting an ID packet with a synchronization word that is extracted from the lower address part (LAP). The LAP is a lower address portion of the BD_ADDR from the slave terminal 2. Upon receiving the ID packet, the slave terminal 2 responds with another ID packet. The master terminal 1 transmits a FHS packet that includes an active member address (AM_ADDR), for example "1" as ID of the slave terminal 2. Upon receiving the FHS packet, the slave terminal 2 responds with an ID packet. The slave terminal 2 switches to the system clock of the master terminal 1 that is included in the FHS packet. Following the FHS packet, the master terminal 1 transmits a POLL packet. In response to the POLL packet, the slave terminal 2 responds with a NULL packet. Finally, the master terminal 1 establishes the connection in the base band layer with the slave terminal 2. The above described initial connection procedure will be repeated for each of the slave terminals 3 through 8.

Link Manager Protocol

Following the above base band protocol and still using the slave terminal 2 as an example, the master terminal 1 and the slave terminal 2 move to establish a connection sequence between link managers in the link layer. The master terminal 1 transmits a LMP_host_connection_req PDU (protocol data unit) signal, and the slave terminal 2 responds by transmitting LMP_accepted PDU signal. Subsequently, the master terminal 1 transmits a LMP_features_req PDU signal, and the slave terminal 2 responds by transmitting a LMP_features_res PDU signal to exchange the information on functions of the respective terminal. To complete the link manager protocol in the link layer, the master terminal 1 transmits a LMP_setup_complete PDU signal, and the slave terminal 2 responds by transmitting a LMP_setup_complete PDU signal.

Service Discovery Protocol

Following the above base band protocol and still using the slave terminal 2 as an example, the master terminal 1 and the slave terminal 2 move to execute a service discovery sequence. The application 60 of the master terminal 1 submits a service discovery request to the SDP task. The SDP task subsequently requests a SPD connection request or a L2CA_ConnectReq event to the L2CAP task. Upon receiving the SPD connection request, the L2CAP task transmits a connection request packet. The L2CAP task on the slave terminal 2 hands over the SDP task a L2CA_ConnectInd message upon receiving the connection request packet. To establish the SDP connection, the L2CAP task on the slave terminal 2 also responds by transmitting the master terminal 1 a connection response packet. The SDP task sends a L2CA_ConfigReq event to the L2CAP task. Upon receiving the event, the L2CAP task transmits a configuration request packet that includes configuration parameter such as quality of service (QoS). The L2CAP task in the slave terminal 2 hands over the SDP task a L2CA_ConfigInd message upon receiving the configuration request packet. The L2CAP task in the slave terminal 2 also responds to the master terminal 1 by transmitting a configuration packet that includes configuration parameters. The SDP task on the master terminal 1 transmits a SDP_ServiceSearchRequest PDU signal with a service search pattern parameter that includes UUID or service unique identifier for indicating a data conferencing service. The SDP task in the slave terminal 2 responds by transmitting a SDP_ServiceSearchResponse PDU.

Following the above established communication, after the application in the master terminal 1 confirms that the slave terminal 2 is a data conferencing terminal, the master terminal 1 sends an OBEX task an OBEX connection request. Via a RF COMM task, the above connection request is sent to the L2CAP task, and the L2CAP task transmits a connection request packet upon receiving the connection request. The L2CAP task on the slave terminal 2 hands over a L2CA_ConnectInd message to the OBEX task via the RFCOMM task. The L2CAP task also responds to the master terminal 1 by transmitting a connection response packet in order to establish the OBEX connection. The OBEX task on the master slave terminal 1 transmits a connect request packet to the slave terminal 2. Upon receiving the response connect packet from the slave terminal 2, the master terminal 1 establishes the OBEX session. The OBEX task on the slave terminal 1 transmits the slave terminal 2 a connect request and establishes the OBEX session upon receiving a connect response packet from the slave terminal 2. The above has described a communication sequence for establishing an OBEX session between the master terminal 1 and one slave terminal such as the slave terminal 2 for transmitting graphic data and data files. As described before, the above described communication sequence is applicable for six other slave terminals 3 through 8 for establishing the Bluetooth network or picket between the master terminal 1 and the slave terminals 2 through 8.

Virtual Connection

In a preferred embodiment of the data conferencing according to the current invention, the following virtual connection will be made. In order to let one of the slave terminals 9 through 11 participate in a data conference, among the slave terminals that are already connected to the picket, the master terminal 1 consecutively places the slave terminals 2 through 4 into a passive mode or an inactive state. The application on the master terminal 1 sends to a LMCE task a park mode setting request for the slave terminal 2. The LMCE task hands over via the HCI 66 a HCI_Park_Mode command to the link manager 67. The above HCI_Park_Mode command includes a Connection_Handle parameter, and the Connection_Handle parameter is set. Furthermore, the Connection_Handle is an identification code for connecting with the slave terminal and sets up an active member address (AM_Addr). When the link manager 67 receives the above HCI_Park_Mode command, the link manager 67 transmits a LMP_park PDU that includes a parked member address (PM_ADDR) containing 1 and an access request address (AR_ADDR) containing 1 to a slave terminal that is specified by the AM_ADDR. The PM_ADDR is a slave terminal identification for identifying a slave terminal that in the park mode. The AR_ADDR is an identification element that is used in a predetermined park mode releasing procedure which the salve terminal initiates.

Upon receiving the LMP_park PDU signal, the slave terminal 2 releases the AM_ADDR and responds by sending a LMP_accepted PDU signal. In the above described manner, the state of the slave terminal 2 becomes inactive or is put into the park mode. Upon receiving the LMP_accepted PDU signal from the slave terminal 2, the master terminal 1 executes a connection procedure for connecting with the slave terminal 9. That is, the master terminal 1 transmits an ID packet that includes a synchronization word from a lower address portion (LAP) of the BD_ADDR, which is received from the slave terminal 9 during an inquiry procedure. Upon receiving the ID packet that includes the synchronization word from the self terminal address, BD_ADDR, the slave terminal 9 responds with the ID packet. The master terminal 1 transmits a FHS packet in which the active member address, AM_ADDR is set to one, and the AM_ADDR indicates an identification number for the slave terminal 9. Upon receiving the FHS packet, the slave terminal 9 responds by transmitting the ID packet. At the same time, the slave terminal 9 switches to the system clock time of the master terminal 1, and the system clock time information is contained in the above FHS packet. Subsequently, the master terminal 1 transmits a POLL packet while the slave terminal 9 responds by transmitting a NULL packet. The above described operations establish the base layer connection.

To communicate with the slave terminal 9, the master terminal 1 executes the similar operation to establish a connection with a link manager as well as the service discover sequence to establish a OBEX session. After a predetermined amount of time or communication data is met, as described above, the master terminal 1 places the slave terminal 3 into the park mode and connects the slave terminal 10 with the picket. Furthermore, after satisfying additional conditions, the master terminal 1 places the slave terminal 4 into the park mode and connects the slave terminal 11 with the picket. At this time, the slave terminals 2 through 4 are in the park mode. Subsequently, after satisfying additional conditions, the master terminal 1 places the slave terminal 5 into the park mode and places the picket the slave terminal 2 that was in the park mode with respect to the picket into the active mode.

Park Mode Release Operation

The master terminal 1 executes the following operations that release the park mode of the slave terminal and put the slave mode back into the active mode. Before the master terminal 1 transmits the LMP_park PDU signal, the master terminal 1 sets a group of predetermined values in parameters for beacon. The beacon parameters include a timing control flag, a beacon instant offset $D_B$, a beacon instant period $T_B$, a beacon slot number per train $N_B$, a beacon slot period $\Delta_B$, a sleep window $N_{Bsleep}$, and a beacon offset $D_{Bsleep}$ with respect to the beacon instant. The above beacon parameters are information that is set for a slave terminal in the park mode.

Figure 5:
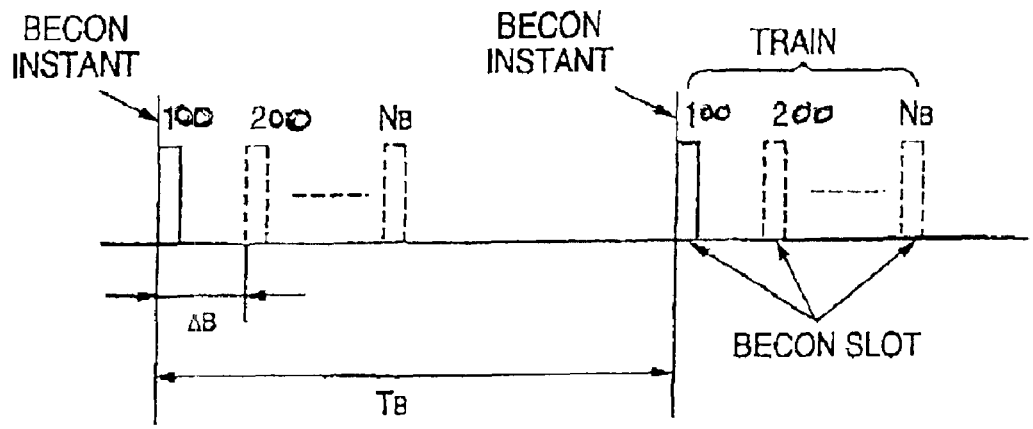
FIG. 5 is a graph illustrating a beacon channel.

Now referring to FIG. 5, a graph illustrates a beacon channel. The beacon channel includes a single beacon slot or a train of equidistant beacon slots that are transmitted at a constant period from the master terminal 1 to the slave terminals. A starting point of a head beacon slot is called a beacon instant and a timing reference for a beacon. The master terminal 1 utilizes the initialization 100 when the most significant bit (MSB) of the current master clock (CLK 27) is zero. Alternatively, the master terminal 1 utilizes the initialization 200 when the most significant bit (MSB) of the current master clock (CLK 27) is one. The master terminal 1 sets the above identification information in the timing control flag. In response, upon receiving the LMP_park PDU signal, the slave terminals set the master-to-slave slot position as indicated by the beacon instant based upon the initialized setting value of 1 or 2 in the timing control flag. Subsequently, the slave terminals synchronize based upon an arbitrary packet that is transmitted via a beacon channel from the master terminal 1. Furthermore, although the slave terminals in the park mode mostly sleep, the inactive slave terminals periodically wake up to re-synchronize by receiving an arbitrary packet via the beacon channel. In the above described manner, the inactive slave terminals maintain the synchronization with the master terminal 1. When the master terminal 1 releases the park mode of the slave terminal, the master terminal 1 transmits a LMP_unpark_PM_ADDR_req PDU signal according to the link manager protocol. The LMP_unpark_PM_ADDR_req PDU signal sets the PM_ADDR of a slave terminal and the AM_ADDR, which is used when the same slave terminal participates again in the picket. Upon receiving the above PDU signal, the slave terminal switches itself from the park mode to the active mode.

In general, the following is internal operations of the master terminal 1 during the release from the park mode. The application 60 of the master terminal 1 sends to the LMCE task a park mode release request for the corresponding slave terminal. The LMCE task hands over to the link manager 67 a HCI_Exit_Park_Mode command containing the same Connection_Handle value that was used to become park mode via the HCI 66. Upon receiving the above command, the link manger 67 transmits the LMP_unpark_PM_ADDR_req PDU signal. As generally described above, the master terminal 1 executes data conferencing by transmitting the conference files and hand-written image data while the participating slave terminals are consecutively switched.

Figure 6:
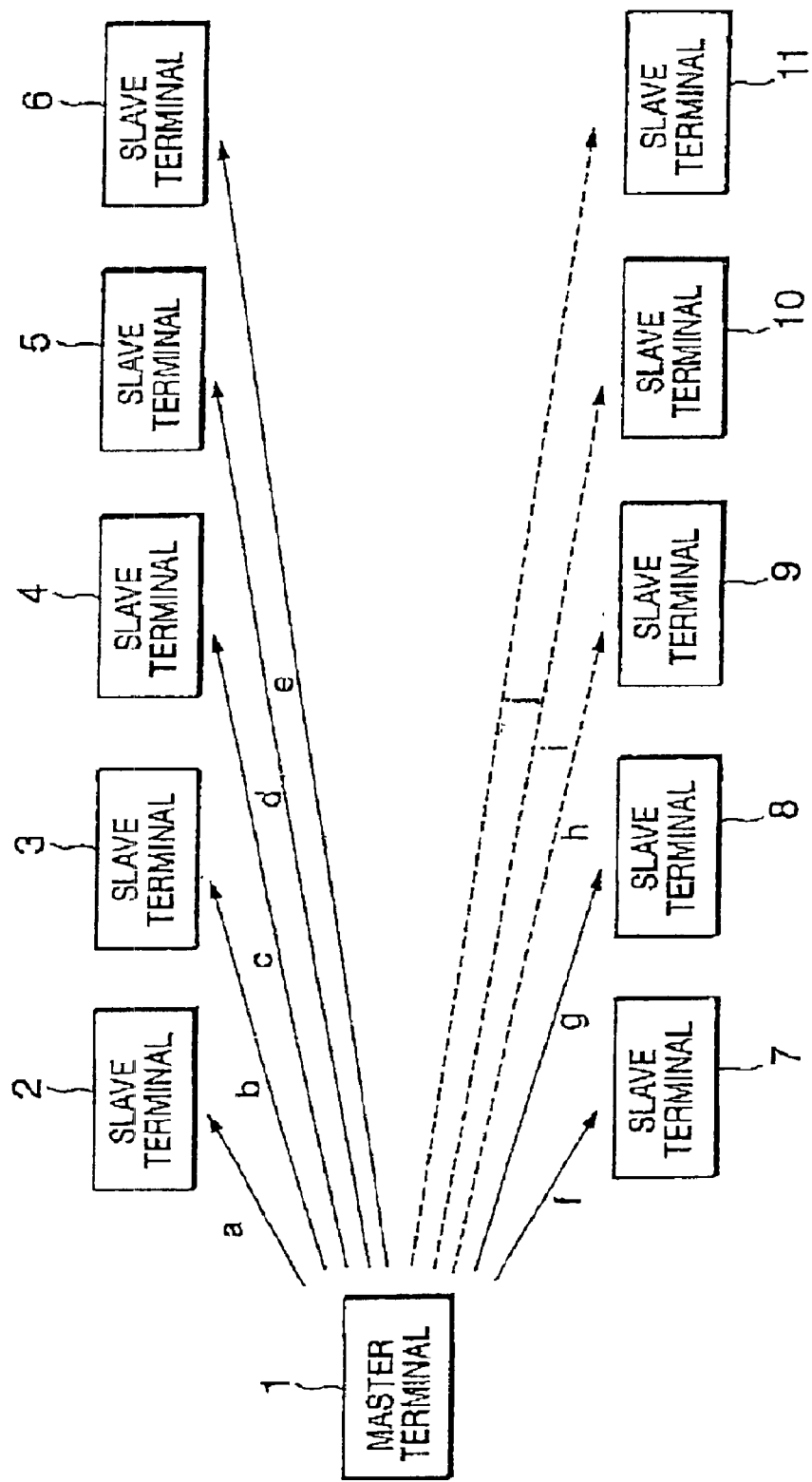
FIG. 6 is a block diagram illustrating a first preferred embodiment of the data conferencing system according to the current invention.

Referring to FIG. 6, a block diagram illustrates a first preferred embodiment of the data conferencing system according to the current invention. The first preferred embodiment includes one master terminal 1 that is controlled by a chairman and a plurality of slave terminals 2 through 11 that are connected to the picket. The master terminal 1 often simultaneously sends data to the slave terminals 2 through 11. The broadcast packet is defined for simultaneous transmission according to the base band specification of the Bluetooth standard. When there is a communication error for receiving the broadcast packet from the master terminal 1 at a slave terminal, the master terminal 1 is not able to execute a recovery communication procedure only between the trouble slave terminal and itself due to the lack of the acknowledgement for the broadcast packet. For the above reason, when entire data such as a binary file transfer needs to be sent to another terminal transparently, it is preferred in the first preferred embodiment that the master terminal 1 transmits the data to each of the slave terminals 2 through 11 in a sequential manner as indicated by lines with an arrow head a through j rather than simultaneously broadcasting via broadcast packet. Furthermore, it is preferred in the first preferred embodiment that a minimal delay occurs in transmitting the data such as hand-written images from the master terminal 1 to the slave terminals 2 through 11 so that the data is displayed in real time.

In the above data transmission where a high quality communication is necessary, it is preferred in the first preferred embodiment that the master terminal 1 sends the data to each of the slave terminals 2 through 11 in a sequential manner as indicated by lines with an arrow head a through j. Another consideration is that the distance between the master terminal 1 and each of the slave terminals 2 through 11 varies in most data conferencing. Because of the unequal distance, the communication speed varies for each slave terminal, and it takes a various amount of time to transmit the same amount of data to each slave terminal. In the first preferred embodiment, the data transmission to a single slave terminal is used as a trigger for the slave terminal mode change operation. The solid lines a through g indicate that the corresponding slave terminals 2 through 8 are in the active mode while the dotted lines k through j indicate that the corresponding slave terminals 9 through 11 are in the inactive mode. The master terminal 1 places one of the inactive slave terminals 9 through 11 in the active mode after the master terminal 1 places one of the active slave terminals 2 through 8 in the inactive mode in response the above described trigger.

Figure 7:
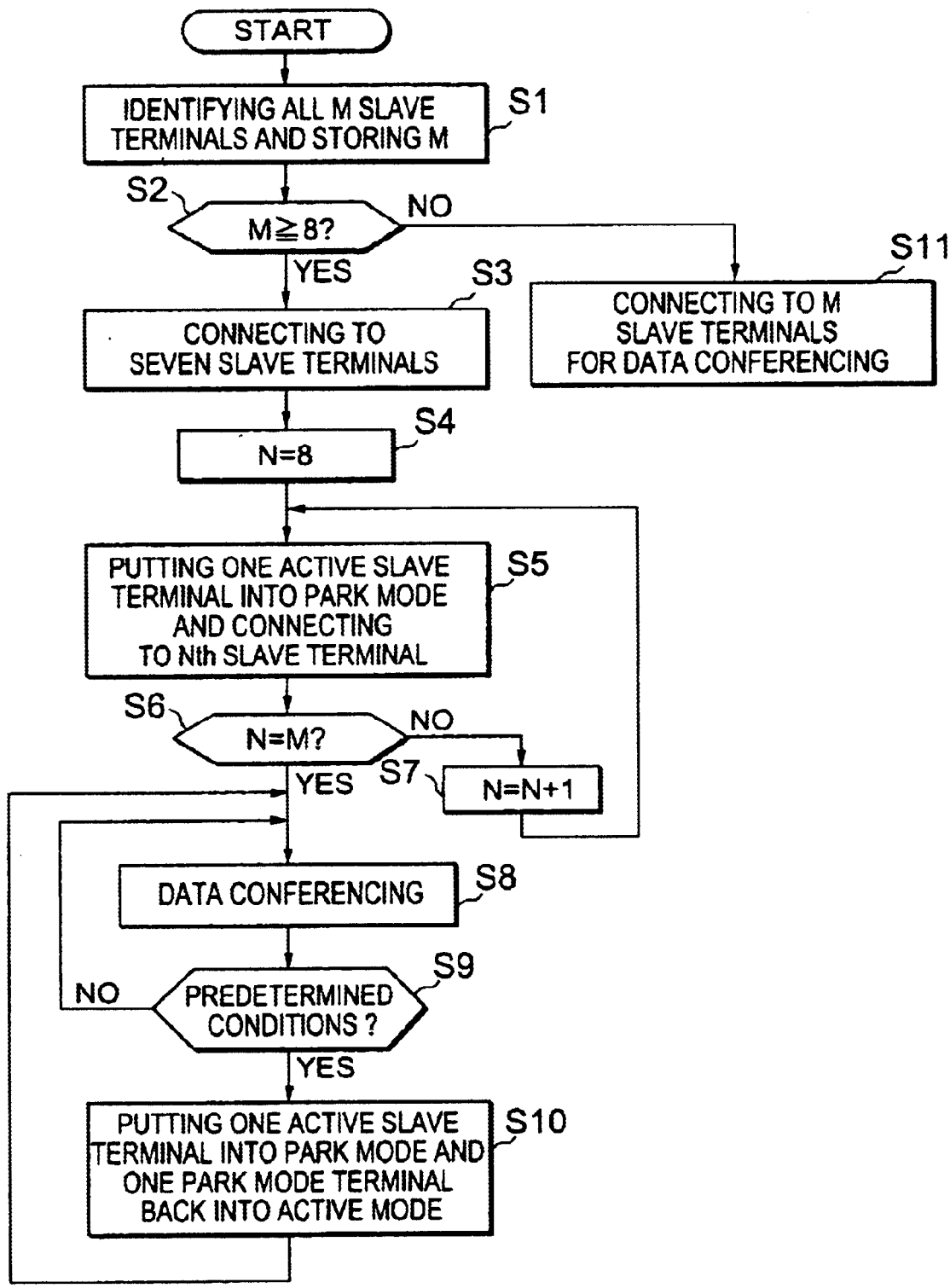
FIG. 7 is a flow chart illustrating steps involved in a preferred process of the master terminal and the slave terminals in data conferencing among a plurality of terminals according to the current invention.

Generally referring to FIG. 7, the following steps of a preferred process according to the current invention are repeated until a termination command is issued via interrupt. To perform high quality communication, the following steps in the preferred process or method sequentially send a predetermined amount of data to each of more than seven slave terminals. In general, after sequentially establishing communication with the seven slave terminals, the master terminal 1 places three active slave terminals into the inactive state; establishes communication with three other slave terminals; and begins a data conference with all of the slave terminals that are identified by the inquiry procedure. Subsequently, a predetermined amount of data is transmitted to one of the slave terminals. When data transmission is completed, the particular slave terminal is put into its park mode while another slave terminal in the park mode is put back into an active mode. The above operation is repeated until the predetermined amount of data is transmitted to every slave terminal. The above predetermined amount of data is a file as a unit or a predetermined amount of written image data.

Still referring to FIG. 7, a flow chart illustrates steps involved in a preferred process of the master terminal and the slave terminals in data conferencing among a plurality of terminals according to the current invention. In a step S1, an inquiry procedure identifies every slave terminal that is capable of communicating with the master terminal 1, and the total number M of the slave terminals is stored. In a step S2, it is determined whether or not the total number M is equal to or larger than 8. If it is determined that the total number M is less than 8 in the step S2, a data conference starts in a step S11 after each of the M slave terminals is sequentially connected for communication. On the other hand, if it is determined that the total number M is equal to or more than 8 in the step S2, initially in a step S3, each of the seven slave terminals is sequentially connected for communication. In a step S4, it is determined that the Nth slave terminal is the eighth slave terminal. In a step S5, one of the active slave terminals is put into the park mode, and the Nth slave terminal is connected for communication. In a step S6, it is determined whether or not the Nth terminal is the total number M. If it is determined that the Nth terminal is not M in the step 6, the Nth indicator is incremented by one in a step 7, and the preferred process returns to the step S5. In contrast, if it is determined that the Nth terminal is M in the step 6, the preferred process initiates and executes a predetermined data conference in a step S8. Subsequently, it is determined in a step S9 whether or not a predetermined condition has been met. If it is determined in the step 9 that the predetermined condition has not yet met, the preferred process proceeds back to the step S8. When the predetermined condition has been met in the step S9, one of the active slave terminals is put back into the inactive or park mode while one of the inactive slave terminals is put back into the active mode in a step S10. Following the operation in the step S10, the preferred process returns to the step S8.

Figure 8:
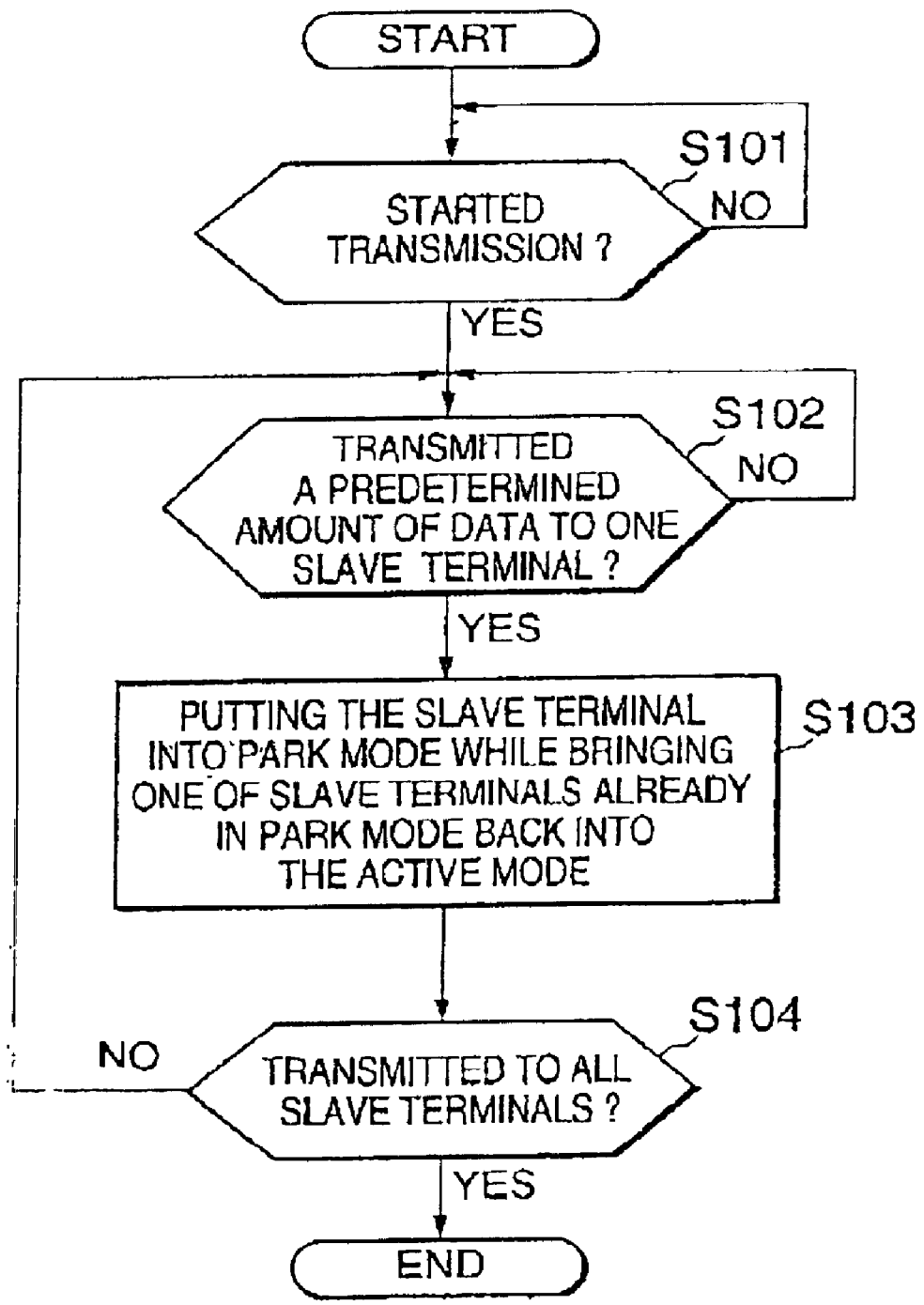
FIG. 8 is a flow chart illustrating steps involved in a first preferred process of the master terminal 1 in data conferencing after every slave terminal is connected according to the current invention.

Now referring to FIG. 8, a flow chart illustrates steps involved in a first preferred process of the master terminal 1 in data conferencing after every slave terminal is connected according to the current invention. In a step S101, it is determined whether or not data transmission has sequentially started to every one of the slave terminals that have been connected to the picket. If it is determined in the step S101 that the sequential transmission has not started, the preferred process repeats the same inquiry in the step S101. On the other hand, if it is determined in the step S101 that the sequential transmission has started, it is further determined in a step S102 whether or not a predetermined amount of data has been transmitted to a particular one of the active slave terminals. If it is determined in the step S102 that the predetermined amount of the data has not been transmitted, the preferred process repeats the step S102 until the data transmission takes place. In contrast, if it is determined in the step S102 that the predetermined amount of the data has been transmitted to one of the active slave terminals, the master terminal 1 places the very same active terminal into its inactive mode while one of the inactive terminals into an active mode. Subsequently, the master terminal 1 confirms in a step S104 that the predetermined amount of data has been transmitted to every one of the slave terminals. If it is determined in the step S104 that the predetermined data has not been transmitted to every slave terminal, the preferred process returns to the step S102. In other words, the steps 102 through 104 are repeated until the predetermined data has been transmitted to every slave terminal. Finally, if it is determined in the step S104 that the predetermined data has been transmitted to every slave terminal, the preferred process terminates its process.

The above flow chart in FIG. 8 describes the steps that place a single slave terminal in the active mode into the park mode after a predetermined amount of data is transferred to a single slave terminal. In other words, the data transmission to a single slave terminal is used as a trigger for the slave terminal mode change operation. In an alternative process of executing a data conference according to the current invention, a plurality of active mode slave terminals is placed into the inactive mode and a plurality of inactive mode slave terminals is placed into the active mode after a predetermined amount of data is transferred to a plurality of the slave terminals. Furthermore, the above operation is not performed on every slave terminal but only on each slave terminal beyond the first seven slave terminals. For example, the above procedure is applicable to ten specified slave terminals for sequentially transmitting data among a total of fifteen slave terminals that are participating in the data conference.

Figure 9:
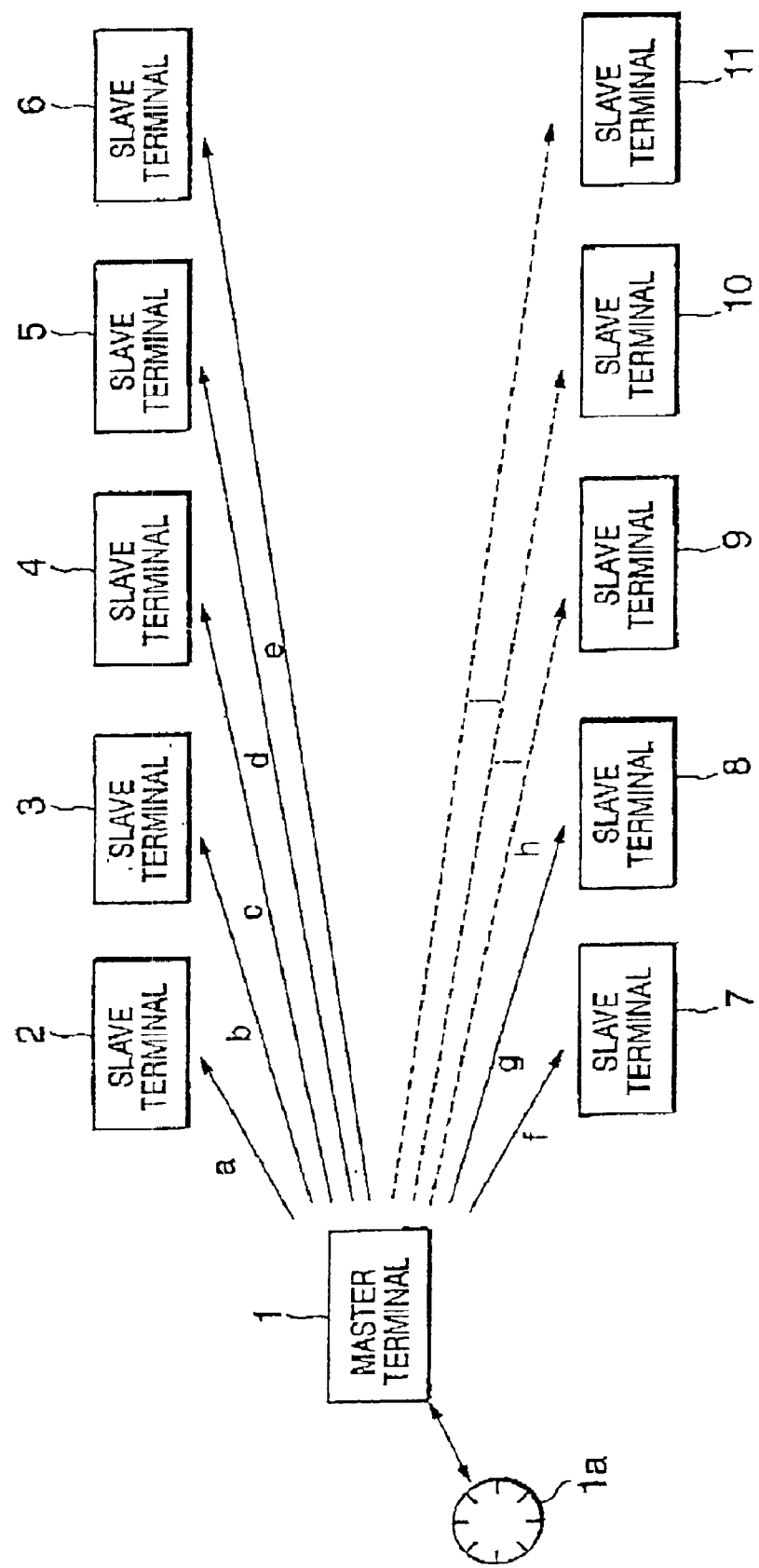
FIG. 9 is a block diagram illustrating a second preferred embodiment of the data conferencing system according to the current invention.

Referring to FIG. 9, a block diagram illustrates a second preferred embodiment of the data conferencing system according to the current invention. In the second preferred embodiment includes one master terminal 1 that is controlled by a chairman and a plurality of slave terminals 2 through 11 that are connected to the picket. In the first preferred embodiment, the data transmission to a single slave terminal is used as a trigger for the slave terminal mode change operation to switch a slave terminal from the active mode into the park mode. In contrast, in the second preferred embodiment, the above described slave terminal mode change operation is triggered after a predetermined amount of time has elapsed. In the second preferred embodiment, the master terminal 1 periodically executes the slave terminal mode change operation in response to a system clock 1a. The system clock 1a is either an external clock or an internal clock within the master terminal 1. The solid lines a through g indicate that the corresponding slave terminals 2 through 8 are in the active mode while the dotted lines k through j indicate that the corresponding slave terminals 9 through 11 are in the inactive mode. The master terminal 1 places one of the inactive slave terminals 9 through 11 in the active mode after the master terminal 1 places one of the active slave terminals 2 through 8 in the inactive mode in response the above described trigger.

Figure 10:
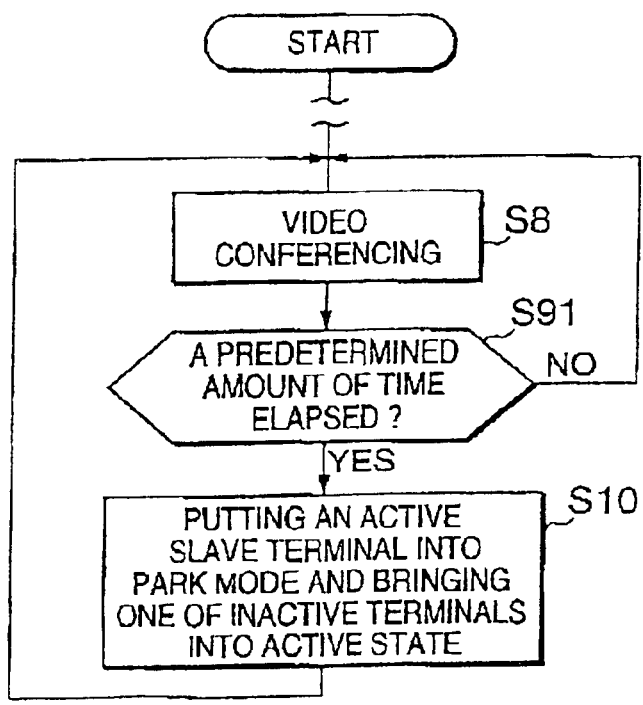
FIG. 10 is a flow chart illustrating steps involved in a second preferred process of the master terminal in data conferencing after every slave terminal is connected according to the current invention.

Now referring to FIG. 10, a flow chart illustrates steps involved in a second preferred process of the master terminal in data conferencing after every slave terminal is connected according to the current invention. Prior to the steps as illustrated in the second preferred process, as described with respect to FIG. 7, the steps of the preferred process according to the current invention are repeated until a termination command is issued via interrupt. In general, after sequentially establishing communication with the seven slave terminals, the master terminal 1 periodically places an active slave terminal into an inactive slave terminal and begins a data conference with all of the slave terminals that are identified by the inquiry procedure. Subsequently, after a predetermined amount of time elapses, a particular slave terminal is put into its park mode while another slave terminal in the park mode is put back into an active mode. More particularly, after it is determined that the condition N=M is met in the step S6 in FIG. 7, the steps as shown in FIG. 10 are performed to determine whether or not the predetermined condition has been satisfied as shown in the step S9 of FIG. 7. While the data conference is conducted in a step S8 of FIG. 7, it is determined in a step S91 whether or not a predetermined amount of time has elapsed. If the predetermined amount of time has not yet elapsed, the second preferred process resumes the data conference as in the step S8. On the other hand, if it is determined in the step S91 that the predetermined amount of time has elapsed, the master terminal 1 places one of the inactive slave terminals 9 through 11 in the active mode after the master terminal 1 places one of the active slave terminals 2 through 8 in the inactive mode in response the above described time trigger in the step S10. Subsequent to the step 10, the second preferred process resumes the data conference in the step S8.

In the above described second preferred process, when there is some data left in a buffer after a predetermined amount of time has elapsed, the data is first transmitted before the above described slave terminal mode change operation is performed. For example, the transmission buffer is a buffer for storing one L2CAP packet. Furthermore, the above flow chart in FIG. 10 describes the steps that place a single slave terminal in the active mode into the park mode after a predetermined amount of time elapses. In an alternative process of executing a data conference according to the current invention, a plurality of active mode slave terminals is placed into the inactive mode and a plurality of inactive mode slave terminals is placed into the active mode after a predetermined amount of time elapses.

Referring to FIG. 1, a diagram illustrates a third preferred embodiment of the data conferencing system according to the current invention. The third preferred embodiment includes one master terminal 1 that is controlled by a chairman and a plurality of slave terminals 2 through 11 that are connected to the picket. In the third preferred embodiment, the chairman needs to identify all slave terminals in the data conference. The seven slave terminals 2 through 8 are connected, and each connection is indicated by a solid line. The three slave terminals 9 through 11 are only virtually connected, and each virtual connection is indicated by a dotted line. A terminal identification or name and a terminal owner name are registered in advance for each of the slave terminals 2 through 11. Based upon a name request message of the link manager protocol, a terminal identification of each of the slave terminals 2 through 11 will be obtained, and the obtained terminal identification is displayed on a LCD display 43 at the master terminal 1 for the chairman to identify the conference participants. The above described communication sequence includes that the master terminal 1 obtains the BA_ADDR of every slave terminal 2 through 11 via the inquiry procedure. Subsequently, the master terminal 1 establishes the connection between the base band layer and the link manager. The link manager of the master terminal 1 transmits a LMP_name_req PDU signal to a slave terminal and receives a LMP_name_req PDU signal from the slave terminal. The slave terminal name or name fragment in the parameter is contained in the LMP_name_res PDU signal, and the slave terminal name is corresponded to the previously obtained BD_ADDR. The correspondence is stored in the memory. Subsequently, the master terminal 1 executes the service discovery sequence and establishes an OBEX connection.

Figure 12:
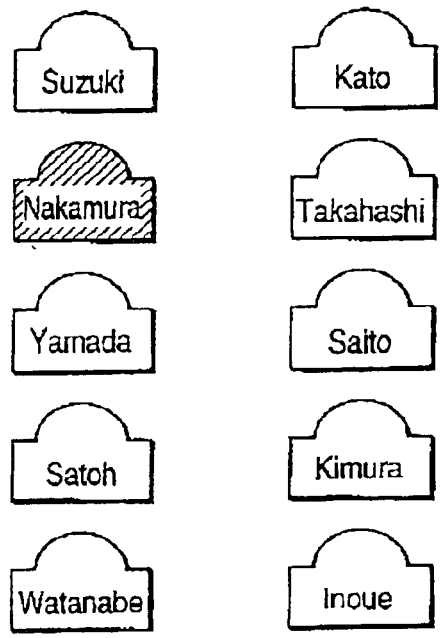
FIG. 12 is a diagram illustrating the slave terminal icons on the master terminal display according to the current invention.
Figure 11:
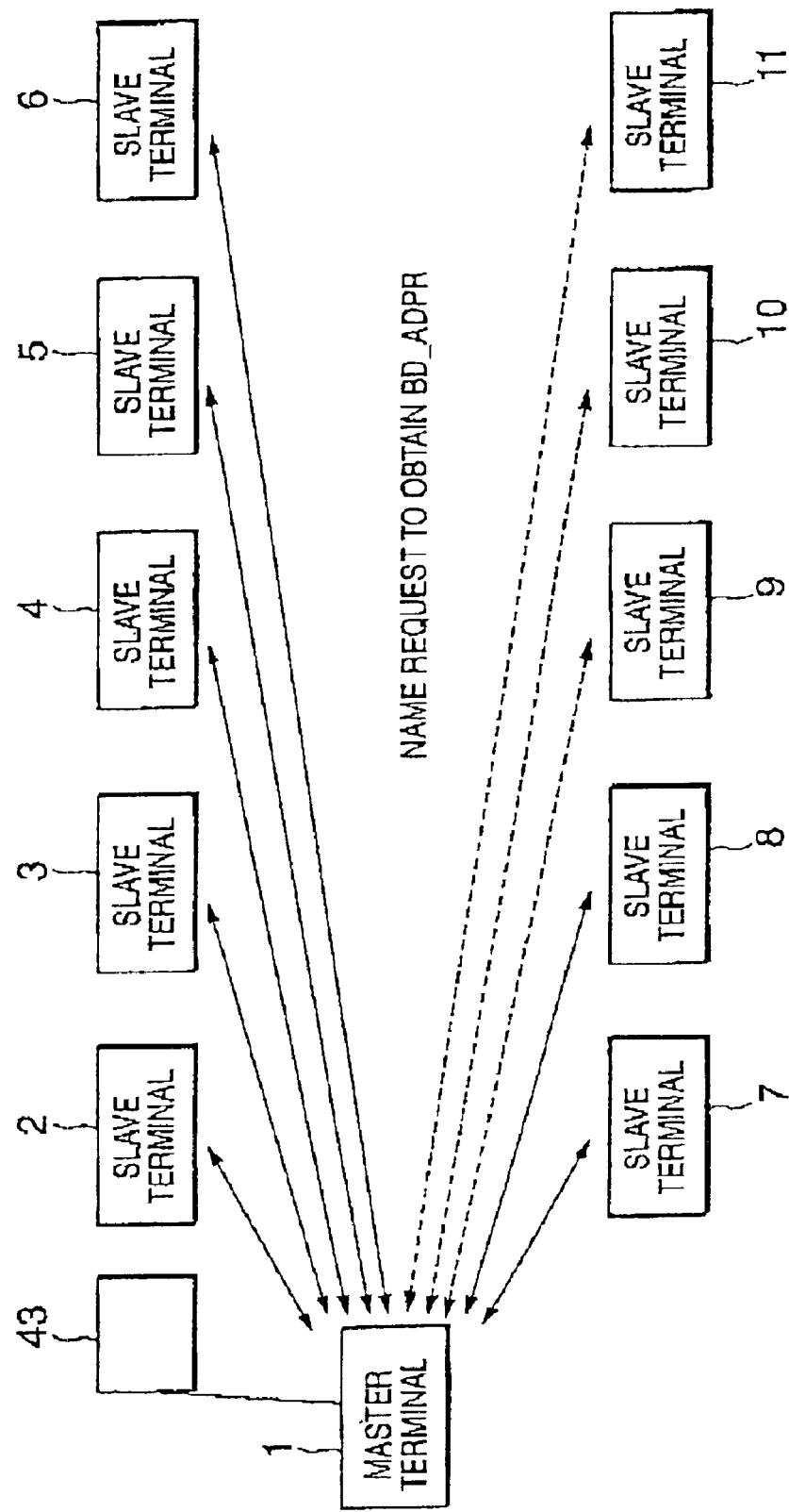
FIG. 11 is a diagram illustrating a third preferred embodiment of the data conferencing system according to the current invention.

FIG. 12 is a diagram illustrating the slave terminal icons on the master terminal display according to the current invention. As described above, the master terminal 1 of the third preferred embodiment according to the current invention obtains every slave terminal name of the ten slave terminals 2 through 11 and displays corresponding slave terminal icons on the LCD 43. The terminal icons are movable within the LCD screen surface 43, and the icons are optionally placed at relative locations with respect to the participants. The terminal icons are displayed on the LCD 43 of not only the master terminal 1 but also the slave terminals 2 through 11 by transmitting the obtained terminal information to the slave terminals 2 through 11. Furthermore, a corresponding icon of the current or last speaker is emphasized by a different color. The above different emphasis is removed after a predetermined amount of time elapses. Each slave terminal is individually specified for an amount of time or a proportion in the inactive state. The chairman of the conference operates the master terminal 1 selects a particular slave terminal by specifying a corresponding icon on the LCD 43 in order to specify a shorter inactive mode than other slave terminals. Other slave terminals have each a predetermined equal period of the inactive state. For example, the slave terminal that is operated by a participant who explains the conference material has the shorter inactive mode than other slave terminals. When the chairman selects an icon for the slave terminal called "Nakamura" and specifies a predetermined amount of time, the selected icon reverses its appearance. The above described selection of a slave terminal and specification of a particular limitation on the selected slave terminal is also applicable for the specification of other limitations with a minor modification.

Figure 13:
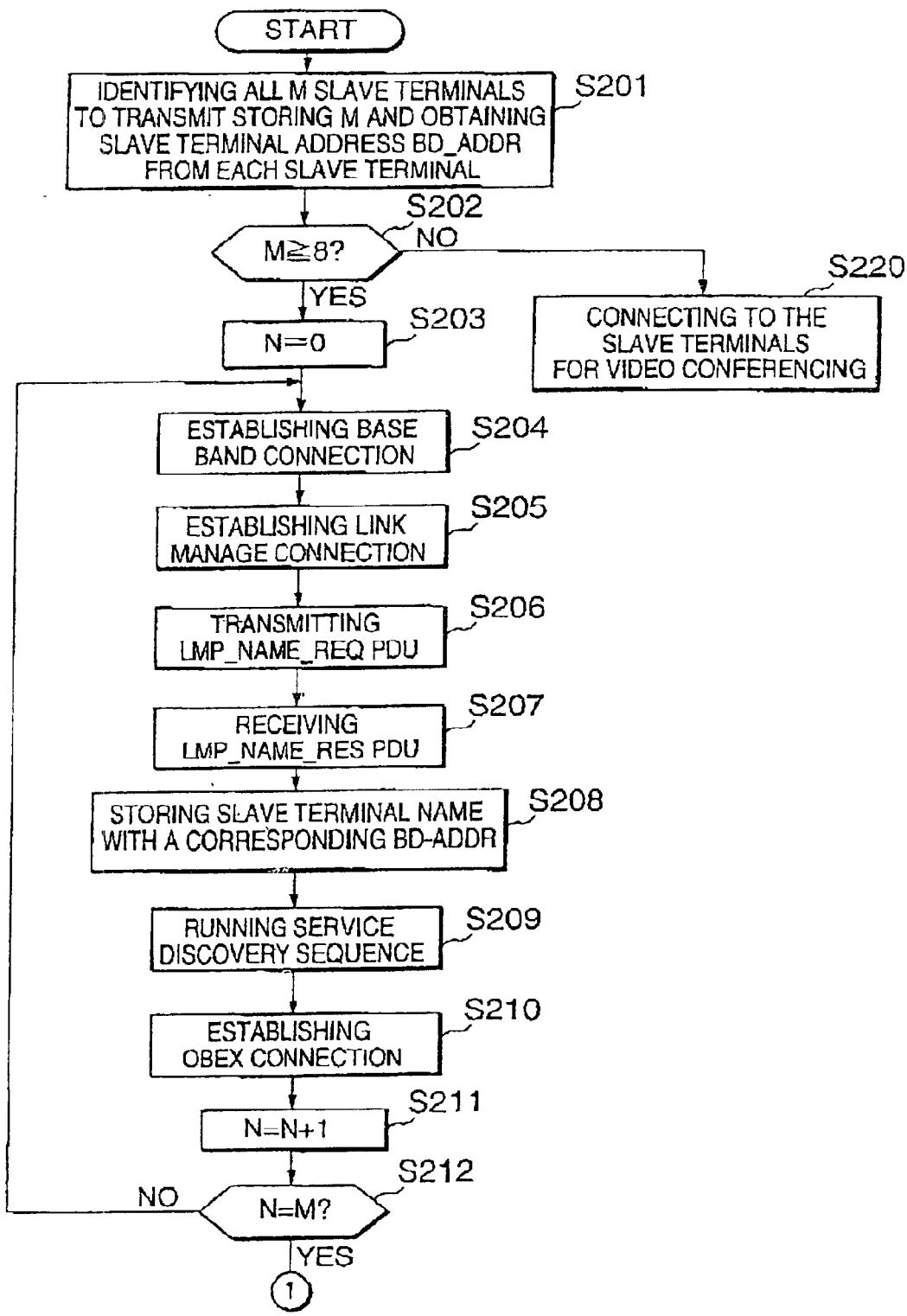
FIG. 13 is a flow chart illustrating some steps involved in a third preferred process of the master terminal in data conferencing according to the current invention.
Figure 14:
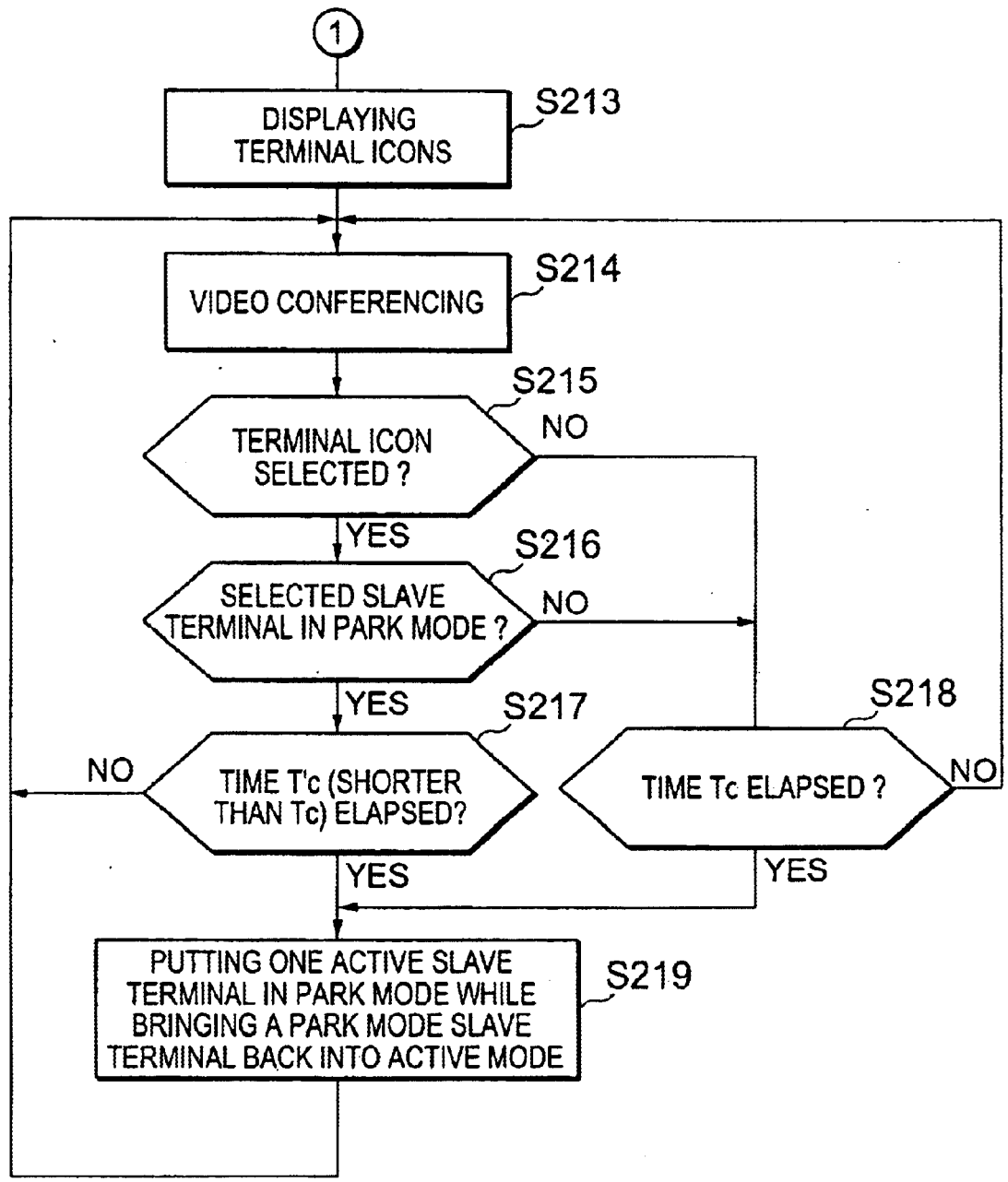
FIG. 14 is a flow chart illustrating other steps involved in the third preferred process of the master terminal in data conferencing according to the current invention.

Now referring to FIGS. 13 and 14, flow charts illustrate steps involved in a corresponding third preferred process of the master terminal in data conferencing according to the current invention. Particularly referring to FIG. 13, the master terminal 1 identifies every slave terminal 2 through 11 that communicates with the master terminal 1 via the inquiry procedure in a step S201. In the step 201, the total number M of the above identified slave terminals 2 through 11 is stored in memory, and the device address BD_ADDR is obtained from every identified slave terminal 2 through 11. The above step 201 is performed with the use of the ID packet and the FHS packet. Subsequently, it is determined whether or not the total number M is equal to or more than a predetermined number, eight in a step S202. If it is determined in the step S202 that the total number M fails to exceed seven, the third preferred process proceeds to a step S220, where the master terminal 1 sequentially connects the slave terminals 2 through 11 and executes a data conference. On the other hand, if it is determined in the step S202 that the total number M exceeds seven, a counter N is initialized to zero in a step S203. The counter N is used to repeat the following steps S204 through S212 for each of the above identified slave terminals 2 through 11. In a step S204, the master terminal 1 establishes base band connection with one of the above identified slave terminals 2 through 11. Furthermore, the master terminal 1 also establishes link manager connection with the same one of the slave terminals 2 through 11 in a step S205. The master terminal 1 transmits a LMP_name_req PDU signal to the slave terminal in a step S206. The slave terminal receives the LMP_name_req PDU signal in the step S207. Upon receiving the LMP_name_req PDU signal, the master terminal 1 stores the terminal name in the LMP_name_res PDU signal that corresponds to the device address BD_ADDR of the slave terminal in a step S208. Furthermore, the master terminal 1 executes the service discovery sequence in a step S209 and establishes an OBEX connection with the slave terminal in a step S210. The master terminal 1 increments the N counter value by one in a step S211. It is determined in a step S212 whether or not the counter N equals to the total number M. If it is determined that the counter N does not equal to M, the third preferred process returns to the step S204.

Now referring to FIG. 14, a second flow chart illustrates other steps involved in the above described third preferred process of the data conferencing according to the current invention. If it is determined in the above step S212 in FIG. 13 that the counter N content equals the total number M, the third preferred process proceeds to a step S213 in FIG. 14. In the step S213, the master terminal 1 displays the slave terminal identification icons on the LCD 43 that have been identified by the terminal name in the steps 204 through 212. For the icon display on the slave terminals, the corresponding information is transmitted along with the data transmission necessary for the data conference. After displaying the terminal identification icons on the LCD 43 in the above described manner, the data conference is executed in a step 214. It is the period after the step S213 that the chairman shortens the park mode or state for a specified slave terminal. The master terminal 1 subsequently determines whether or not any of the displayed icons is selected by the operator such as the chairman of the data conference in a step S215. If it is determined in the step S2 15 that a displayed icon has been selected, it is further determined in a step S216 whether or not a corresponding slave terminal for the selected icon is in the predetermined inactive or park state. In case that the selected slave terminal is found to be in the inactive mode in the step S216, the final determination includes an amount of time T when the selected slave terminal has been in the inactive state in a step S217. It is also finally determined in the step S217 whether or not the time T is equal to or over a second predetermined amount of time T'c, which is shorter than a first predetermined amount of time Tc, during which unselected slave terminals are in the sleep mode. If the result in the step S217 is negative, the third preferred process returns to the step S214. If the three inquiry results in the above steps S215, S216 and S217 are each positive, the third preferred process places one of the active slave terminal into its inactive state while it places one of the inactive slave terminal into its active state in a step S219. The preferred process then returns to the step S214 to resume the data conference. On the other hand, if the inquiry result in the above step S215 or S216 is negative, it is further determined in a step S218 whether or not the predetermined time Tc has elapsed. If it is determined in the step S218 that the predetermined time Tc has elapsed, the third preferred process proceeds to the step S219. If it is determined in the step S218 that the predetermined time Tc has not elapsed, the third preferred process resumes to the step S214.

To summarize, in the communication sequence of the third preferred process in which one of the active slave terminals is placed into its inactive mode while one of the inactive slave terminals is placed into its active mode for each predetermined period, the inactive state period of a specified slave terminal is arbitrarily established. Furthermore, after the predetermined amount of time Tc or T'c has elapsed, if data is left un-transmitted in a transmission buffer of the master terminal 1, the master terminal first transmits the transmission data before one of the active slave terminals is placed into its inactive mode while one of the inactive slave terminals is placed into its active mode for each predetermined period. For example, the above transmission buffer is a buffer for storing one L2CAP packet. Lastly, in the communication sequence of the third preferred process in which one of the active slave terminals is placed into its inactive mode while one of the inactive slave terminals is placed into its active mode for each predetermined period, an alternative process places a plurality of inactive slave terminals into their active state and a plurality of active slave terminals into their inactive state for each predetermined amount of time (Tc or T'c).

Figure 15:
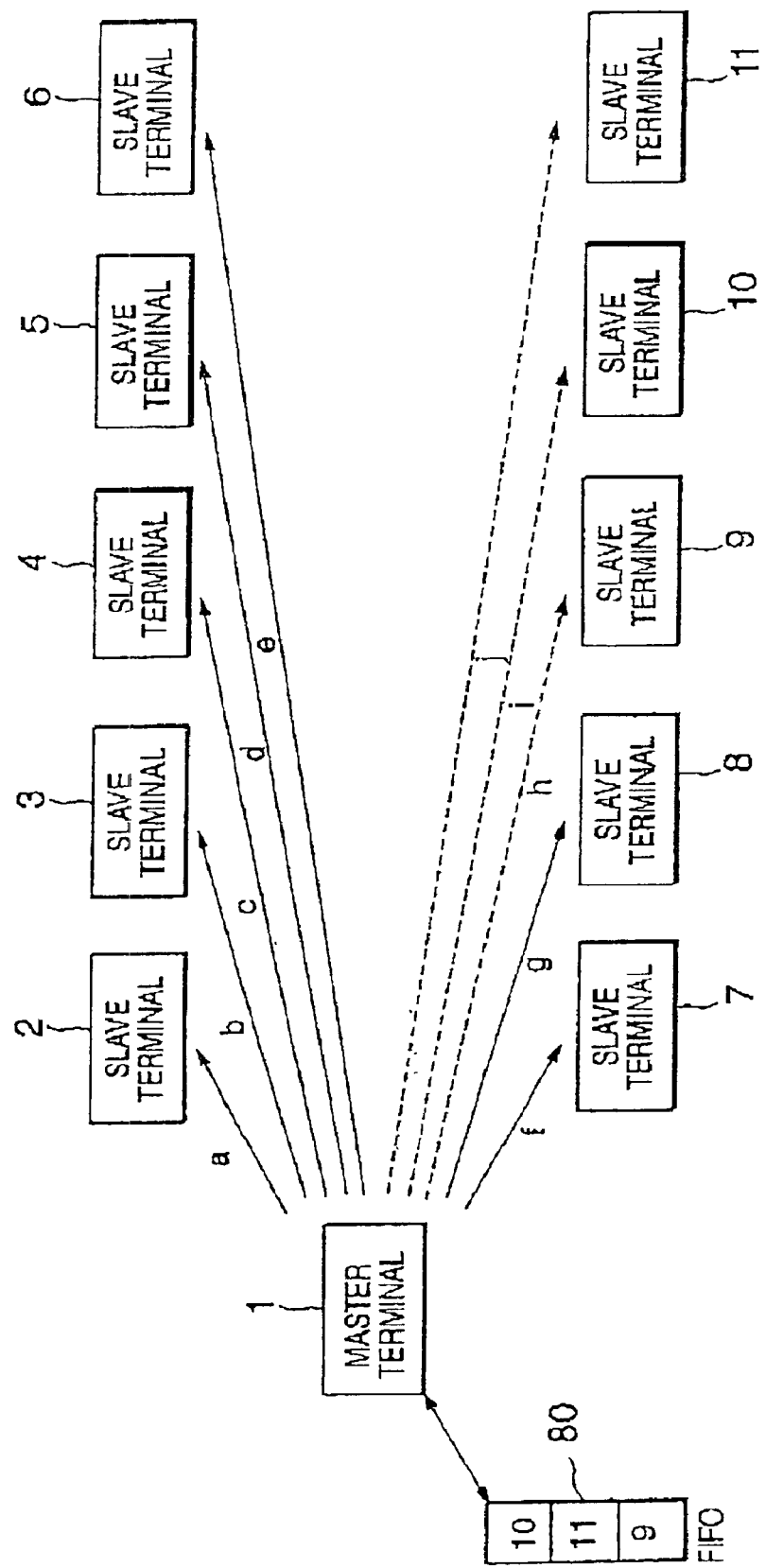
FIG. 15 is a diagram illustrating a fourth preferred embodiment of the data conferencing system according to the current invention.

Now referring to FIG. 15, a diagram illustrates a fourth preferred embodiment of the data conferencing system according to the current invention. The fourth preferred embodiment includes one master terminal 1 that is controlled by a chairman and a plurality of slave terminals 2 through 11 that are connected to the picket. The solid lines a through g indicate that the corresponding slave terminals 2 through 8 are in the active mode while the dotted lines k through j indicate that the corresponding slave terminals 9 through 11 are in the inactive mode. The fourth preferred embodiment performs the steps as described with respect to FIG. 7 with the exception of the step 10 according to the current invention. In particular, in the step S10, one of inactive slave terminals is selected based upon an order in which the slave terminals are placed in the active state. In other words, the master terminal 1 stores in the memory unit 80 the order in which the slave terminals are placed in the inactive state. For example, the slave terminals 9 through 11 are put into the inactive state in the first-in-first-out (FIFO) order of the slave terminals 9, 11 and 10 as indicated in the memory unit 80. For the next execution of the step S10, the inactive slave terminal 9 which was stored in first will be placed back into its active state. If the above described reviving scheme were applied to the second preferred embodiment, the inactive state lasts equally among the slave terminals 2 through 11. On the other hand, if the above described reviving scheme were applied to the third preferred embodiment, the percentage in the inactive state of the specified slave terminal is less than that of the unspecified slave terminals if the time period T'c is set to be shorter than the predetermined time Tc and the slave terminal elapses the time period T'c.

Figure 16:
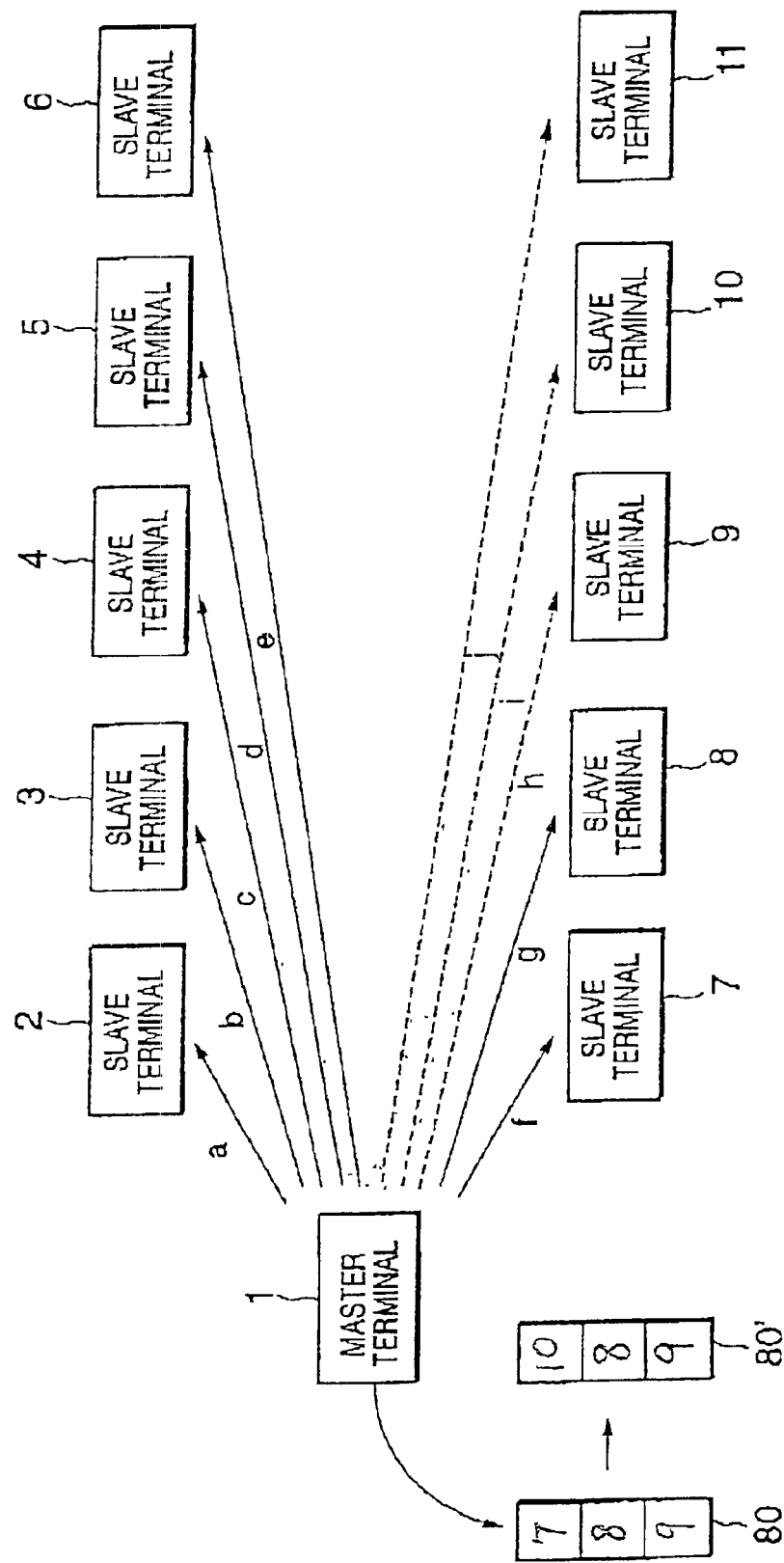
FIG. 16 is a diagram illustrating a fifth preferred embodiment of the data conferencing system according to the current invention.

Now referring to FIG. 16, a diagram illustrates a fifth preferred embodiment of the data conferencing system according to the current invention. The fifth preferred embodiment includes one master terminal 1 that is controlled by a chairman and a plurality of slave terminals 2 through 11 that are connected to the picket. The solid lines a through g indicate that the corresponding slave terminals 2 through 8 are in the active mode while the dotted lines k through j indicate that the corresponding slave terminals 9 through 11 are in the inactive mode. In certain instances, a chairman of a data conference would like to specify the active state of a particular slave terminal to be longer than other slave terminals. For example, the particular slave terminal is operated by a participant who describes the conference material. In the above described circumstances, after the specified slave terminal is placed into the inactive state, the specified slave terminal has priority in the above order to make an inactive slave terminal into an active slave terminal. For example, the slave terminal 10 is specified by the master terminal 1 and there are three inactive slave terminals 7 through 9. When the active slave terminal 10 is placed into inactive state and the inactive slave terminal 7 is placed into active state, the slave terminal 10 is placed at the top of the inactive slave terminal list that already contains the slave terminals 8 and 9 in a memory unit 80. After a next period, the active slave terminal 11 is placed into inactive state and the inactive slave terminal 10 is placed into active state. That is, in the fifth preferred embodiment, assuming that a period Tcp is an amount of time for a slave terminal in an inactive state before switching into its active state, the amount of time in the inactive state is Tcp×3 or Tcp×4 for unspecified slave terminals while that is Tcp for an specified slave terminal.

Figure 17:
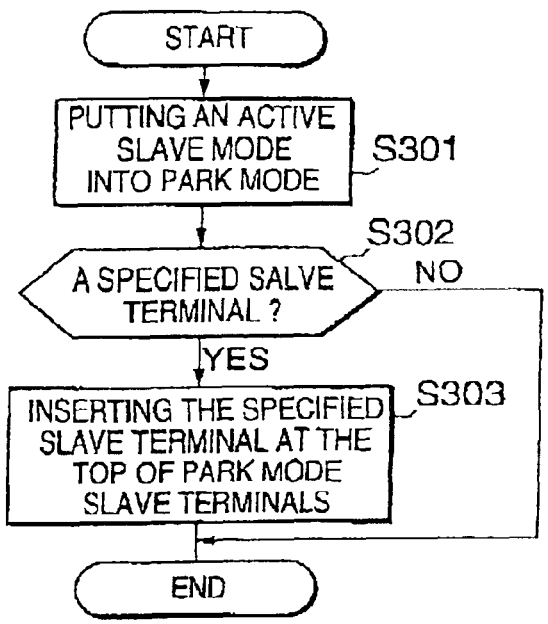
FIG. 17 is a flow chart illustrating steps involved in a fifth preferred process of the data conferencing according to the current invention.

Now referring to FIG. 17, a flow chart illustrates steps involved in a fifth preferred process of the data conferencing according to the current invention. After the master terminal 1 starts communication, the master terminal 1 establishes the OBEX session with every slave terminal and selects one of the slave terminals. The steps involved in the above described operations are substantially identical to those of the third preferred process as described with respect to FIG. 13. In general, the steps illustrated in FIG. 17 follows those of FIG. 13. The step S219 in FIG. 14 substantially corresponds to a step S301 in FIG. 17, where the master terminal 1 places an active slave terminal into its inactive state. In a step S302, it is determined whether or a slave terminal has been specified by the chairman of the data conference to be later placed back into an active state on a priority basis. If it is determined in the step S302 that the specified slave terminal does not exist, the fifth preferred process proceeds to an end. On the other hand, if it is determined in the step S302 that the specified slave terminal does exist, the specified slave terminal is placed into the inactive state, and its corresponding identification is placed at the top of the inactive slave terminal list in a step S303. In the above step S303, a predetermined buffer area holds the information on the above inactive slave terminal list and has an open top slot for inserting the specified slave terminal information. The open slot is at the top in the fifth preferred embodiment. In an alternative embodiment, the open slot is at a predetermined position in the buffer area.

Figure 18:
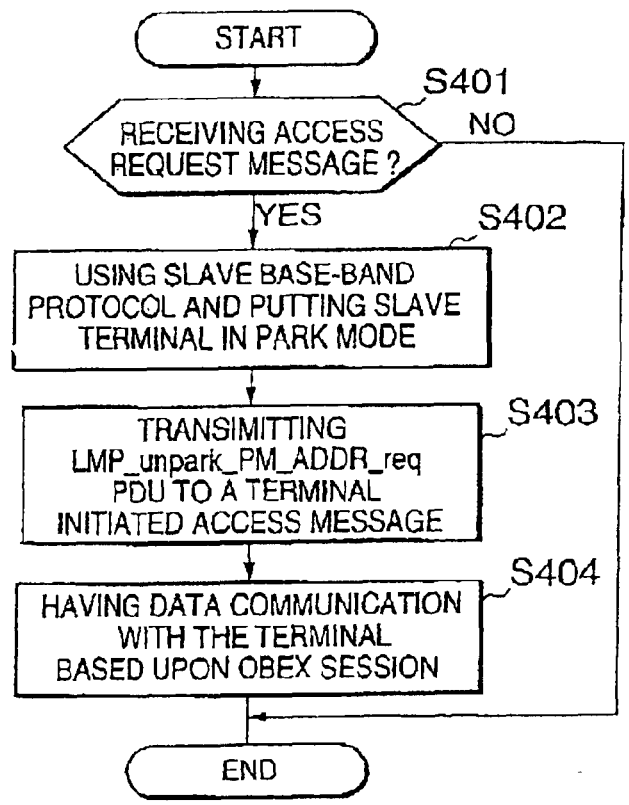
FIG. 18 is a flow chart illustrating steps involved in a sixth preferred process of the data conferencing according to the current invention.

FIG. 18 is a flow chart illustrating steps involved in a sixth preferred process of the data conferencing according to the current invention. The sixth preferred process involves the steps that the mater terminal 1 performs to switches a slave terminal from the inactive state to the active state upon receiving a park mode release request from the slave terminal. In general, the inactive slave terminal transmits an ID packet containing a device access code (DAC) of the master terminal 1 as an access request message using an appropriate slave-to-master half slot. Upon receiving the above access request message, the master terminal 1 transmits the LMP__unpack__PM__ADDR__req signal that includes the slave terminal's PM__ADDR and the AM__ADDR that the slave terminal uses when it participates to the picket again. The slave terminal that has received the above PDU signal is switched from the park mode to the active mode.

In particular to FIG. 18, the sixth preferred process will be described with respect to the data conference system that includes the master terminal 1 and slave terminals 2 through 11 as shown in FIG. 6. It is assumed that the slave terminals 2 through 8 are in the active state while the slave terminals 9 through 11 are in the inactive state. It is also assumed that the master terminal 1 sequentially transmits a file to the slave terminals 2 through 8 and that the file is currently being transmitted to the slave terminal 6. It is determined whether or not the slave terminal 10 has transmitted the access request message and that the master terminal 1 has received the access request message in a step S401. If it is determined in the step S401 that the master terminal 1 has not received the access request message, the sixth preferred process repeats the step S401. On the other hand, if it is determined in the step S401 that the master terminal 1 has received the access request message, the sixth preferred process proceeds to a step S402. In the step S402, one slave terminal is selected from a group of the slave terminals that excludes the slave terminal 6, which is currently transferring a file using a protocol that is higher than the base band. The selected slave terminal is put into the inactive mode in the step S402. Subsequently, in a step S403, the slave terminal 10 is switched to active by transmitting the LMP unpark__PM__ADDR__req PDU signal to the slave terminal 10. Finally, in a step S404, the slave terminal 10 executes data communication with the master terminal 1 using an OBEX session. Since the master terminal 1 establishes a separate OBEX session with an individual slave terminal, the master terminal 1 executes separate data communication with an individual slave terminal. For example, the master terminal 1 transmits a file A to the slave terminal 6 while it transmits a file B to the slave terminal 10. It is preferred that to change the active state to the inactive state, the master terminal 1 selects one of the slave terminals 2 through 5, which have completed the file transfer.

Figure 19:
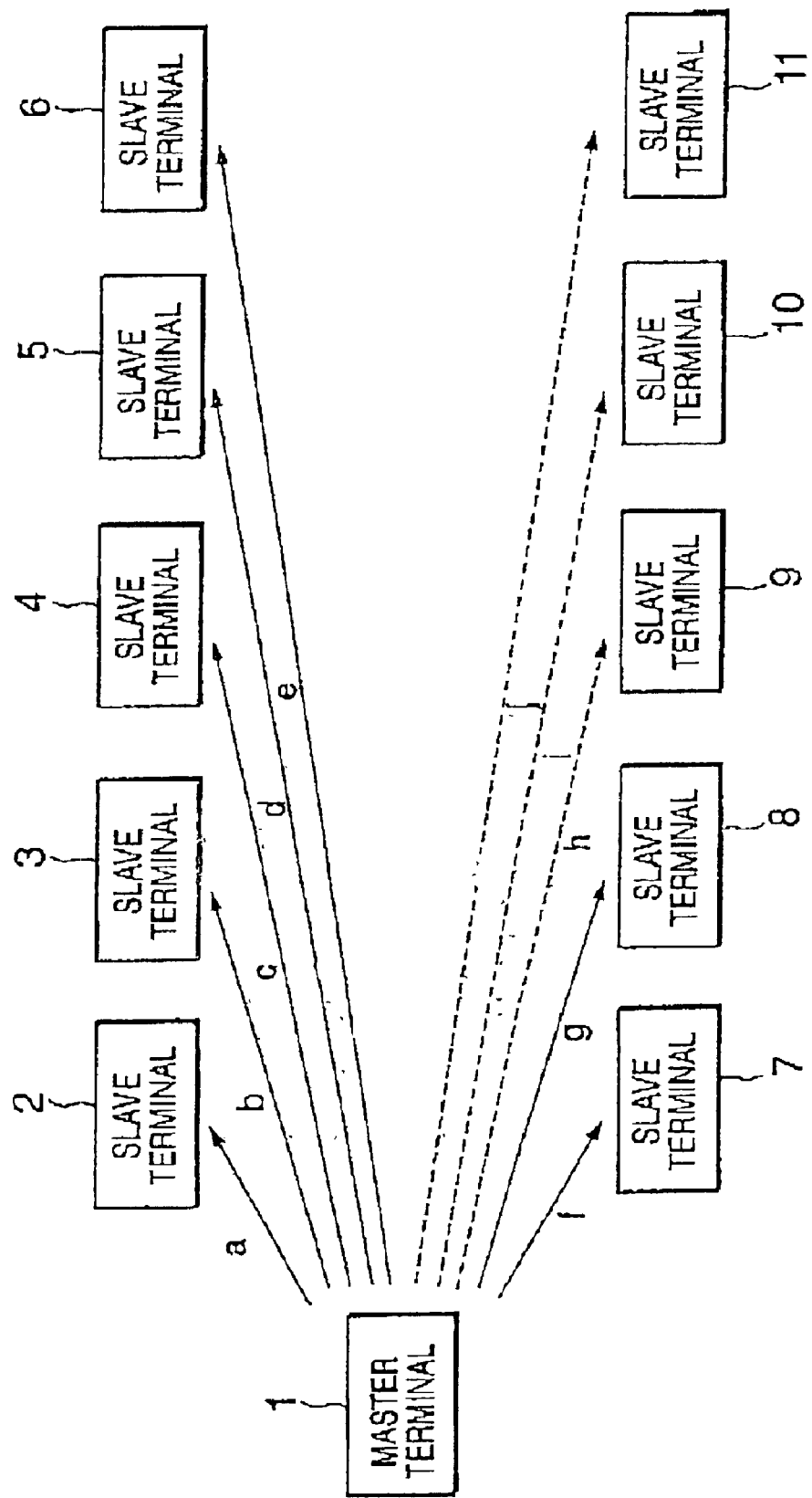
FIG. 19 is a diagram illustrating a seventh preferred embodiment of the data conferencing system according to the current invention.

Now referring to FIG. 19, a diagram illustrates a seventh preferred embodiment of the data conferencing system according to the current invention. The seventh preferred embodiment includes one master terminal 1 that is controlled by a chairman and a plurality of slave terminals 2 through 11 that are connected to the picket. The solid lines a through g indicate that the corresponding slave terminals 2 through 8 are in the active mode while the dotted lines k through j indicate that the corresponding slave terminals 9 through 11 are in the inactive mode. In general, the master terminal 1 is portable and consumes low power. The master terminal 1 is also equipped with a smallsize memory unit. Furthermore, while the master terminal 1 transmits data such as files or object data using a single OBEX session, the master terminal 1 does not execute any other data transmission. In other words, only one of the solid lines a through g is actively communicating at any given time. While the master terminal 1 transmits the file or object data using an OBEX session, it does not change any of the active slave terminals into the inactive state. Similarly, while the master terminal 1 transmits the file or object data using an OBEX session, if the master terminal 1 receives an inactive state release request from an inactive slave terminal or an access request message, it does not change the state of the slave terminals until the current data transfer is complete. After the completion of the above data transfer, the master terminal 1 places an active slave terminal into its inactive state and subsequently transmits a LMP_unpark_PM_ADDR_req PDU signal to the slave terminal that has requested the inactive state release. Finally, the slave terminal 1 places the same inactive slave terminal into its active state. Thus, the slave terminal enjoys data communication with the mater terminal 1 using an OBEX session.

Figure 20:
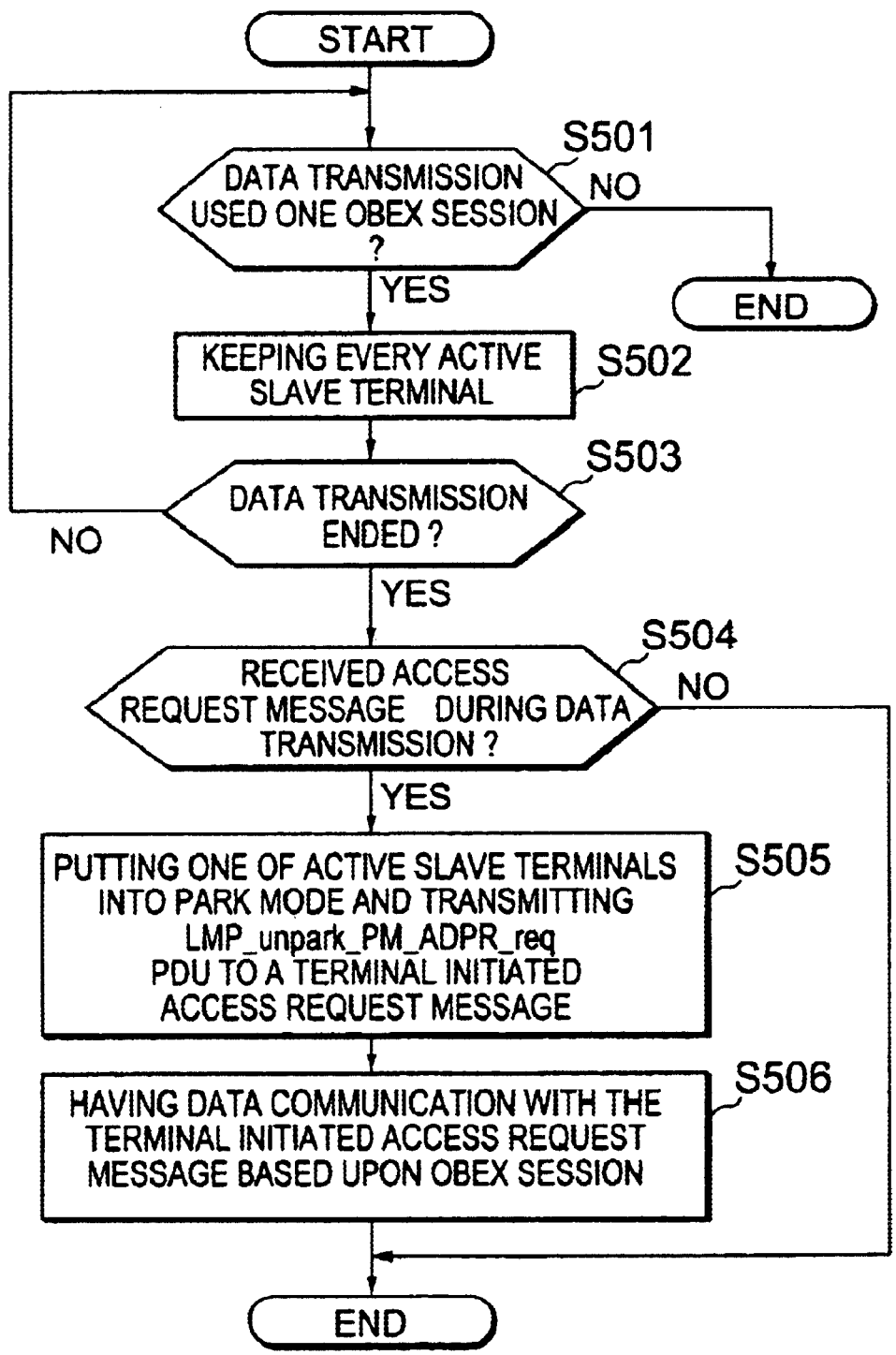
FIG. 20 is a flow chart illustrating steps involved in a seventh preferred process of the data conferencing according to the current invention.

FIG. 20 is a flow chart illustrating steps involved in a seventh preferred process of the data conferencing according to the current invention. In a step S501, it is determined whether or not data is being transferred using an OBEX session. If it is determined in the step S501 that no data transfer currently takes place, the seventh preferred process terminates. On the other hand, if it is determined in the step S501 that data transfer currently takes place, every active slave terminal is kept in its active state and will not be changed to its inactive state or park mode in a step S502, and the data transfer is continued. It is further determined in a step S503 whether or not the data transfer has been completed. During the steps 501 through 503, the master terminal 1 stores in the memory every access request message from an inactive slave terminal for requesting to switch its state to an active one. If it is determined that the data transfer has not been yet completed in the step S503, the seventh preferred embodiment returns to the step S501 and repeats the steps 501 and 502. On the other hand, if it is determined that the data transfer has been already completed in the step S503, it is further determined in a step S504 whether or not the master terminal 1 has received any access request message from an inactive slave terminal during the steps 501 through 503 while the data was being transferred. If it is determined in the step S504 that the mater terminal has received no access request message, the seventh preferred process terminates itself. On the other hand, if it is determined in the step S504 that the mater terminal has received at least one access request message, the master terminal 1 places one currently active slave terminal into a park mode, and transmits the LMP_unpark_PM_ADDR_req PDU signal to the inactive slave terminal that sent the access request message in a step S505. Subsequently, the master terminal 1 places the above inactive slave terminal into its active state in the step S505. Finally, the master terminal 1 communicates with the above slave terminal based upon an OBEX session in a step S506 before the seventh preferred process terminates. In the above described steps, although an example has been illustrated that a single slave terminal is used to transfer data based upon an OBEX session, two slave terminals are also optionally used to perform the steps involved in the seventh preferred process except for modifying the condition in the step S501. It is preferred that the seventh preferred process is performed based upon the function and performance of the master terminal 1.

In an alternative embodiment of the data conference system according to the current invention, an educational institution takes advantage of the above described features. For example, a teacher uses a master terminal while students use slave terminals. The display portion of each terminal such as LCD is used as a traditional blackboard during a class room session.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of controlling wireless communication between a master terminal and slave terminals, comprising;
   a) establishing a connection between the master terminal and a predetermined maximal number of the slave terminals to have active slave terminals;
   b) identifying remaining unconnected slave terminals as inactive slave terminals in case a number of the slave terminals exceeds the predetermined maximal number;
   c) removing one of the active slave terminals from the connection to turn into an inactive slave terminal while establishing one of the inactive terminals for the connection with the master terminal in case the number of the slave terminals exceeds the predetermined maximal number;
   d) repeating said step c) until every one of the slave terminals is at least once connected with the master terminal; and
   e) communicating among the master terminal and the active slave terminals until a predetermined condition is met.

2. The method of controlling wireless communication between a master terminal and slave terminals according to claim 1 wherein said steps a) through e) are performed in accordance with the Bluetooth protocol.

3. The method of controlling wireless communication between a master terminal and slave terminals according to claim 1 wherein said step e) performs data conferencing among the master terminal and the active slave terminals.

4. The method of controlling wireless communication between a master terminal and slave terminals according to claim 1 wherein said step e) performs class room instructions among the master terminal and the active slave terminals.

5. The method of controlling wireless communication between a master terminal and slave terminals according to claim 1 wherein said step e) further comprises the following steps:
   determining an amount of data communication between the master terminal and the active slave terminals;
   comparing the data communication amount to a predetermined data communication amount to generate a data comparison result; and
   based upon the data comparison result, removing one of the active slave terminals from the connection to turn into an inactive slave terminal while establishing one of the inactive terminals for the connection with the master terminal to turn into an active slave terminal.

6. The method of controlling wireless communication between a master terminal and slave terminals according to claim 5 wherein said step e) further comprises the following steps:
   determining an amount of data communication transferred from the master terminal to one of the active slave terminals;
   comparing the data communication amount to a predetermined data communication amount to generate a data comparison result; and
   based upon the data comparison result, removing the one of the active slave terminals from the connection to turn into an inactive slave terminal while establishing the one of the inactive terminals for the connection with the master terminal to turn into the active slave terminal.

7. The method of controlling wireless communication between a master terminal and slave terminals according to claim 6 further comprising an additional step of selecting one of inactive terminals in accordance with a predetermined order prior to establishing the selected one of the inactive terminals with the master terminal to turn into the active slave terminal.

8. The method of controlling wireless communication between a master terminal and slave terminals according to claim 6 wherein the one of the active slave terminals is removed from the connection only when there is no communication among the master terminal and the slave terminals.

9. The method of controlling wireless communication between a master terminal and slave terminals according to claim 1 wherein said step e) further comprises the following steps:
   determining an amount of time during communication among the master terminal and the active slave terminals;
   comparing the amount of the time to a predetermined time to generate a time comparison result; and
   based upon the time comparison result, removing one of the active slave terminals from the connection to turn into an inactive slave terminal while establishing one of the inactive terminals for the connection with the master terminal to turn into an active slave terminal.

10. The method of controlling wireless communication between a master terminal and slave terminals according to claim 9 wherein the predetermined time varies among the slave terminals.

11. The method of controlling wireless communication between a master terminal and slave terminals according to claim 9 wherein the one of the active slave terminals is removed from the connection only when there is no communication among the master terminal and the slave terminals.

12. The method of controlling wireless communication between a master terminal and slave terminals according to claim 9 further comprising an additional step of selecting one of inactive terminals in accordance with a predetermined order prior to establishing the selected one of the inactive terminals with the master terminals to turn into the active slave terminal.

13. The method of controlling wireless communication between a master terminal and slave terminals according to claim 1 wherein said step e) further comprises the following steps:
   requesting an inactive state release from one of the inactive slave terminals during communication among the master terminal and the active slave terminals; and
   based upon the inactive state release request, removing one of the active slave terminals from the connection to turn into an inactive slave terminal while establishing the one of the inactive terminals for the connection with the master terminal to turn into an active slave terminal.

14. The method of controlling wireless communication between a master terminal and slave terminals according to claim 13 wherein the one of the active slave terminal fails to act on communication in the upper layers of a base band.

15. The method of controlling wireless communication between a master terminal and slave terminals according to claim 13 wherein the one of the active slave terminals is removed from the connection only when there is no communication among the master terminal and that slave terminal.

16. The method of controlling wireless communication between a master terminal and slave terminals according to claim 1 wherein said step e) further comprises the following steps:
   determining whether or not any slave terminal has been selected;
   determining whether or not the selected slave terminal is in an inactive state;
   determining an amount of time of the selected inactive slave terminal;
   comparing the amount of the time to a predetermined time to generate a time comparison result; and
   based upon the time comparison result, removing one of the active slave terminals from the connection to turn into an inactive slave terminal while establishing the selective inactive terminal for the connection with the master terminal to turn into an active slave terminal.

17. The method of controlling wireless communication between a master terminal and slave terminals according to claim 16 wherein the predetermined time varies among the slave terminals.

18. The method of controlling wireless communication between a master terminal and slave terminals according to claim 16 wherein the one of the active slave terminals is removed from the connection only when there is no communication among the master terminal and that slave terminals.

19. A system for controlling wireless communication, comprising;
   a number of slave terminals; and
   a master terminal for establishing a wireless connection between said master terminal and a predetermined maximal number of said slave terminals to have active slave terminals in accordance with the Bluetooth protocol, said master terminal identifying remaining unconnected ones of said slave terminals as inactive slave terminals in case the number of said slave terminals exceeds the predetermined maximal number, said master terminal removing one of said active slave terminals from the wireless connection to turn into one of said inactive slave terminals while establishing one of said inactive terminals for the wireless connection with said master terminal until every one of said slave terminals is at least once wirelessly connected with said master terminal, said master terminal communicating with said active slave terminals until a predetermined condition is met.

20. The system for controlling wireless communication according to claim 19 wherein said master terminal and said slave terminals perform communication for data conferencing.

21. The system for controlling wireless communication according to claim 19 wherein said master terminal and said slave terminals perform communication for class room instructions.

22. The system for controlling wireless communication according to claim 19 wherein said master terminal determines an amount of data communication between said master terminal and said active slave terminals, said master terminal comparing the data communication amount to a predetermined data communication amount to generate a data comparison result, and said mater terminal removing one of said active slave terminals from the wireless connection to turn into one of said inactive slave terminals while establishing one of said inactive terminals for the wireless connection with said master terminal to turn into one of said active slave terminals based upon the data comparison result.

23. The system for controlling wireless communication according to claim 22 wherein said master terminal further determines an amount of data communication transferred from said master terminal to a particular one of said active slave terminals, said master terminal comparing the data communication amount to a predetermined data communication amount to generate a data comparison result, and said master terminal removing one of said active slave terminals from the wireless connection to turn into one of said inactive slave terminals while establishing said one of said inactive terminals for the wireless connection with the master terminal to turn into one of said active slave terminals based upon the data comparison result.

24. The system for controlling wireless communication according to claim 23 wherein said master terminal further selecting one of said inactive terminals in accordance with a predetermined order prior to establishing said selected one of said inactive terminals with said master terminal to turn into one of said active slave terminals.

25. The system for controlling wireless communication according to claim 23 wherein said master terminal removes said one of said active slave terminals from the wireless connection only when there is no communication between said master terminal and said active slave terminals.

26. The system for controlling wireless communication according to claim 19 wherein said master terminal determines an amount of time during communication among said master terminal and said active slave terminals, said mater terminal comparing the amount of the time to a predetermined time to generate a time comparison result, and said mater terminal removing one of said active slave terminals from the wireless connection to turn into one of said inactive slave terminals while establishing one of said inactive terminals for the wireless connection with said master terminal to turn into one of said active slave terminals based upon the time comparison result.

27. The system for controlling wireless communication according to claim 26 wherein the predetermined time varies among said slave terminals.

28. The system for controlling wireless communication according to claim 26 wherein said master terminal removes said one of said active slave terminals from the wireless connection only when there is no communication among said master terminal and said slave terminals.

29. The system for controlling wireless communication according to claim 26 wherein said master terminal selects one of said inactive terminals in accordance with a predetermined order prior to establishing said selected one of said inactive terminals for the wireless connection with said master terminal to turn into one of said active slave terminals.

30. The system for controlling wireless communication according to claim 19 wherein one of said inactive slave terminals transmits to said master terminal an inactive state release request during communication among said master terminal and said active slave terminals, and in response to the inactive state release request, said master terminal removing one of said active slave terminals from the wireless connection to turn into one of said inactive slave terminals while establishing said one of said inactive terminals for the wireless connection with said master terminal to turn into one of said active slave terminals.

31. The system for controlling wireless communication according to claim 30 wherein said one of said active slave terminals fails to act on communication in the upper layers of a base band.

32. The system for controlling wireless communication according to claim 30 wherein said one of said active slave terminals is removed from the connection only when there is no communication among said master terminal and said slave terminal.

33. The system for controlling wireless communication according to claim 19 wherein said master terminal determines whether or not any one of said slave terminals has been selected, said master terminal determining whether or not said selected slave terminal is in an inactive state, said master terminal determining an amount of time of said selected inactive slave terminal, said master terminal comparing the amount of the time to a predetermined time to generate a time comparison result, and said master terminal removing one of said active slave terminals from the connection to turn into one of said inactive slave terminals while establishing said selective inactive terminal for the wireless connection with said master terminals to turn into one of said active slave terminals based upon the time comparison result.

34. The system for controlling wireless communication according to claim 33 wherein the predetermined time varies among said slave terminals.

35. The system for controlling wireless communication according to claim 33 wherein said one of said active slave terminals is removed from the connection only when there is no communication among said master terminal and said slave terminal.

36. A master terminal for controlling wireless communication among a number of slave terminals, comprising;
   a Bluetooth module for establishing a wireless connection between said master terminal and a predetermined maximal number of the slave terminals to have active slave terminals in accordance with the Bluetooth protocol; and
   a CPU operationally connected to said Bluetooth module for identifying remaining unconnected ones of the slave terminals as inactive slave terminals in case the number of said slave terminals exceeds the predetermined maximal number, said CPU instructing said Bluetooth module to remove one of the active slave terminals from the wireless connection to turn into one of the inactive slave terminals while establishing one of the inactive terminals for the wireless connection with said master terminal until every one of the slave terminals is at least once wirelessly connected with said master terminal, said master terminal communicating with the active slave terminals until a predetermined condition is met.

37. The master terminal for controlling wireless communication among a number of slave terminals according to claim 36 wherein said CPU determines an amount of data communication between said master terminal and the active slave terminals, said CPU comparing the data communication amount to a predetermined data communication amount to generate a data comparison result, and said Bluetooth module removing one of the active slave terminals from the wireless connection to turn into one of the inactive slave terminals while establishing one of the inactive terminals for the wireless connection with said Bluetooth module to turn into one of the active slave terminals based upon the data comparison result.

38. The master terminal for controlling wireless communication among a number of slave terminals according to claim 37 wherein said CPU further determines an amount of data communication transferred from said master terminal to a particular one of the active slave terminals, said CPU comparing the data communication amount to a predetermined data communication amount to generate a data comparison result, and said Bluetooth module removing one of the active slave terminals from the wireless connection to turn into one of the inactive slave terminals while establishing the one of the inactive terminals for the wireless connection with said Bluetooth module to turn into one of the active slave terminals based upon the data comparison result.

39. The master terminal for controlling wireless communication among a number of slave terminals according to claim 36 wherein said CPU determines an amount of time during communication among said master terminal and the active slave terminals, said CPU comparing the amount of the time to a predetermined time to generate a time comparison result, and said Bluetooth module removing one of the active slave terminals from the wireless connection to turn into one of the inactive slave terminals while establishing one of the inactive terminals for the wireless connection with said master terminal to turn into one of the active slave terminals based upon the time comparison result.

40. The master terminal for controlling wireless communication among a number of slave terminals according to claim 39 wherein the predetermined time varies among the slave terminals.

41. The master terminal for controlling wireless communication among a number of slave terminals according to claim 39 wherein said Bluetooth module removes said one of the active slave terminals from the wireless connection only when there is no communication among said master terminal and the slave terminals.

* * * * *